US012269096B2

(12) United States Patent
Kim et al.

(10) Patent No.: US 12,269,096 B2
(45) Date of Patent: Apr. 8, 2025

(54) METHOD FOR PREPARING DISPERSED METAL NANOPARTICLES AND METAL NANOPARTICLES PREPARED THEREBY

(71) Applicant: University-Industry Cooperation Group of Kyung Hee University, Yongin-si (KR)

(72) Inventors: Woo Sik Kim, Suwon-si (KR); Taekyung Yu, Seoul (KR); Jiang Pengfei, Yongin-si (KR)

(73) Assignee: University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 17/956,232

(22) Filed: Sep. 29, 2022

(65) Prior Publication Data

US 2023/0106726 A1    Apr. 6, 2023

(30) Foreign Application Priority Data

Oct. 1, 2021  (KR) ................. 10-2021-0131117

(51) Int. Cl.
*B22F 9/24* (2006.01)
*B01J 19/18* (2006.01)
*B22F 1/054* (2022.01)
*B22F 1/14* (2022.01)
*B82Y 40/00* (2011.01)

(52) U.S. Cl.
CPC ............. *B22F 9/24* (2013.01); *B01J 19/1806* (2013.01); *B22F 1/054* (2022.01); *B22F 1/14* (2022.01); *B01J 2219/00166* (2013.01); *B01J 2219/024* (2013.01); *B01J 2219/0245* (2013.01); *B22F 2301/10* (2013.01); *B22F 2301/25* (2013.01); *B82Y 40/00* (2013.01)

(58) Field of Classification Search
CPC ...... B22F 1/054; B22F 1/0545; B22F 1/0547; B22F 1/0549; B22F 1/0551; B22F 1/0553; B22F 1/056; B22F 1/14; B22F 9/24; B01J 19/1806; B01J 2219/00166; B01J 2219/00186; B01J 2219/00189; B01J 2219/024; B01J 2219/0245; B82Y 40/00
See application file for complete search history.

(56) References Cited

U.S. PATENT DOCUMENTS

2007/0292686 A1*  12/2007  Nagasawa ............ C01G 23/053
                                              423/610
2017/0197244 A1*   7/2017  Choi .................... B22F 1/052

FOREIGN PATENT DOCUMENTS

KR         2016102791 A  *  8/2016  .......... B01J 19/2405
KR    10-2017-0098529 A      8/2017
(Continued)

OTHER PUBLICATIONS

RU-2533622-C1 Search translation (Year: 2006).*
(Continued)

*Primary Examiner* — Ricardo D Morales
(74) *Attorney, Agent, or Firm* — Westman, Champlin & Koehler, P.A.; Amanda M. Prose

(57) ABSTRACT

The present disclosure relates to a dispersed metal nanoparticle synthesis method and metal nanoparticles prepared thereby. Specifically, the present disclosure relates to a method of effectively preparing a dispersed metal nanoparticle using Taylor vortex flow even when using a small amount of stabilizer or using no stabilizer, and well-dispersed nanoparticles obtained thereby.

6 Claims, 20 Drawing Sheets

(56) References Cited

FOREIGN PATENT DOCUMENTS

| KR | 10-2018-0014980 A |   | 2/2018  |
|----|-------------------|---|---------|
| KR | 10-2019-0121958 A |   | 10/2019 |
| KR | 102310352 B1      |   | 10/2021 |
| RU | 2533622 C1        | * | 11/2014 |
| WO | 2019177205 A1     |   | 9/2019  |

OTHER PUBLICATIONS

Tang, Z. et al. "Studies on morphology changes of copper sulfide nanoparticles in a continuous Couette-Taylor reactor" Chemical Engineering Journal 359 (2019) 1436-1441.

Jiang, P. "Dispersion Control using Taylor-Vortex Flow in the Synthesis of CuPd Alloy Nanoparticles" Theories and Applications of Chem. Eng. (2021) vol. 27, No. 1.

Office Action issued in related KR patent applciation Serial No. 10-2021-0131117, dated Mar. 31, 2023, with English machine translation.

Hanizam, H. et al. "Optimisation of mechanical stir casting parameters for fabrication of carbon nanotubes-aluminium alloy composite through Taguchi method" Journal of Materials Research and Technology (2019) vol. 8, Issue 2, pp. 2223-2231.

Office Action issued in related KR patent applciation Serial No. 10-2021-0131117, dated Sep. 19, 2023, with English machine translation.

Hecold, M. et al. "The Effect of PEI and PVP-Stabilized Gold Nanoparticles on Equine Platelets Activation: Potential Application in Equine Regenerative Medicine" Journal of Nanomaterials vol. 2017, Article ID 8706921, 11 pages.

* cited by examiner

METHOD FOR PREPARING DISPERSED METAL NANOPARTICLES AND METAL NANOPARTICLES PREPARED THEREBY

CROSS REFERENCE TO RELATED APPLICATION

The present application claims priority to Korean Patent Application No. 10-2021-0131117 (filed on Oct. 1, 2021), which is hereby incorporated by reference in its entirety.

TECHNICAL FIELD

The present disclosure relates to a method capable of improving the dispersion of nanoparticles using flow characteristics of a fluid.

BACKGROUND

Recently, nanoparticles have attracted great attention in many industries of electronics, biology, energy, medicine, catalysts, and environment due to their excellent electro-physical properties such as high specific surface area, excellent electrical performance, and easily adjustable optical properties. For example, since the surface area of catalyst particles depends directly on the dispersion and size of nanoparticles, preparing nanoparticles that are well dispersed in a solution is very important in the field of catalysts. In addition, nanoparticles have a property of easily aggregating due to high surface energy.

Due to the properties of nanoparticles, the smaller the nanoparticles, the better the aggregation occurs, and due to the agglomeration properties, there is a problem in that the original properties of the nanoparticles are significantly deteriorated, thereby limiting the application field. Accordingly, it is very important in the synthesis to disperse the nanoparticles so that they do not aggregate.

Conventionally, in order to solve the agglomeration problem of nanoparticles, large amounts of surfactants, stabilizers and additives are used in the process of preparing the dispersed metal nanoparticles. However, an excessive amount of surfactants may bind strongly to the nanoparticles to form thick organic layers blocking the active sites of the nanoparticles.

Accordingly, there is a need to develop a new method for preparing nanoparticles that allows the nanoparticles to be well dispersed using less or no additives such as stabilizers.

SUMMARY

In view of the above, the present disclosure provides a method for preparing a metal nanoparticle with excellent dispersibility using a small amount of stabilizers or using no stabilizers.

Further, the present disclosure provides a metal nanoparticle having a large active surface area of particles, a high ratio of active area to volume, and excellent dispersibility prepared with a small amount of stabilizers or without stabilizers for dispersibility.

The method for preparing a dispersed metal nanoparticle according to one aspect of the present disclosure can produce a metal nanoparticle, which is generally difficult to disperse, in a well-dispersed form using a strong and regular flow called a Taylor vortex flow. In addition, it is possible to produce a large amount of metal nanoparticles having an excellent dispersibility and a small size using a small amount of stabilizers or without using stabilizers. This can be widely used in the organic chemical industry that requires various metal catalysts and the sensor industry using optical nanoparticles.

The dispersed metal nanoparticle according to another aspect of the present disclosure has excellent dispersibility despite being small nanoparticles having a high surface area, and has a higher active area than conventional nanoparticles since stabilizers are rarely or never used during the synthesis process.

DETAILED DESCRIPTION

Figure 1:
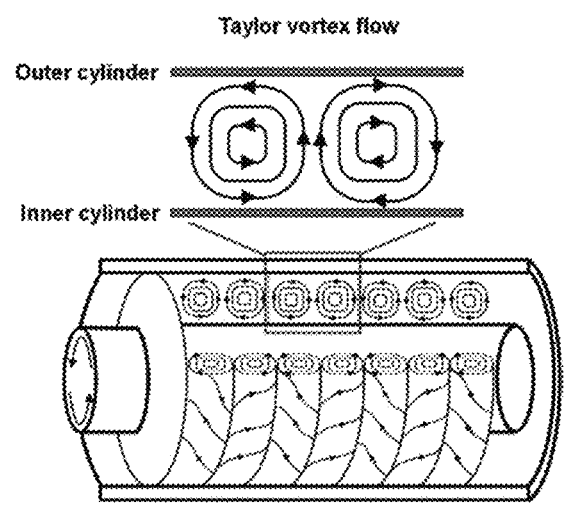
FIG. 1 schematically shows a flow of fluid in a continuous Couette-Taylor reactor.

Hereinafter, the present disclosure will be described in detail with reference to the drawings.

First, the terms and words used in the specification and claims should not be construed as conventional or dictionary meanings, but should be construed as meanings and concepts conforming to the technical idea of the present disclosure based on the principle that the inventor can appropriately define the concept of terms to describe his/her disclosure in the best way.

Accordingly, each configuration of the present disclosure will be described in detail so that those skilled in the art may easily implement the present disclosure, but this is only an example and the scope of the present disclosure is not limited by the following descriptions.

Hereinafter, the configuration of the present disclosure will be described in detail.

According to one aspect of the present disclosure, there is provided is a method for preparing a dispersed metal nanoparticle, which comprises a step of reacting a metal precursor under a Taylor vortex flow formed in a continuous Couette-Taylor reactor.

The method of preparing the dispersed metal nanoparticle in accordance with one aspect of the present disclosure is characterized by using the Taylor vortex flow. In other words, the aggregation of nanoparticles is greatly suppressed by using the motion of the fluid called Taylor vortex flow even when using little or no stabilizer, and thus the nanoparticles can be easily dispersed in the fluid. Further, it is possible to realize nanoparticles of desired dispersion and size by controlling the motion of the fluid.

The nanoparticles may be nanoparticles obtained by a chemical reaction such as a reduction/oxidation reaction of precursors introduced into a solution, and include nanoparticles of a metal, a metal alloy (e.g., a binary metal, a ternary metal, etc.), an oxide, a hydroxide, a sulfide, and the like.

The metal nanoparticles may include one or more transition metals. For example, the nanoparticles may be, as prepared metal nanoparticles, nanoparticles of a metal or a metal alloy (e.g., a binary metal, a ternary metal, or the like) including one or more metals selected from the group consisting of palladium (Pd), platinum (Pt), ruthenium (Ru), gold (Au), silver (Ag), rhodium (Rh), cobalt (Co), nickel (Ni), copper (Cu), iron (Fe), titanium (Ti), chromium (Cr), manganese (Mn), gallium (Ga), zirconium (Zr), hafnium (Hf), osmium (Os) and iridium (Ir), or may be nanoparticles of an oxide (e.g., NiO or the like), a hydroxide (e.g., $NiFe(OH)_2$ or the like), a sulfide (e.g., CuS or the like), or the like including one or more metals selected from the above-described group.

The metal nanoparticles may be catalysts.

According to one embodiment of the present disclosure, the metal nanoparticle prepared by the production method according to the present disclosure may be represented by the following Chemical Formula 1:

$$A_xB_y \qquad \text{[Chemical formula 1]}$$

In the chemical Formula 1, A is a first transition metal, and B is a second transition metal, wherein the first transition metal and the second transition metal are different from each other; x is the molar ratio of A and y is the molar ratio of B, each independently ranging from 1 to 99 and x+y=100.

The first transition metal and the second transition metal may, each independently, be selected from ruthenium (Ru), rhodium (Rh), palladium (Pd), iridium (Ir), platinum (Pt), gold (Au), silver (Ag), cobalt (Co), nickel (Ni), iron (Fe), copper (Cu), manganese (Mn), or a mixture thereof.

Specifically, the first transition metal may be a precious metal. More specifically, A may be ruthenium (Ru), rhodium (Pd), palladium (Pd), iridium (Ir), platinum (Pt), gold (Au), silver (Ag), or a mixture thereof, and may be, for example, palladium (Pd), platinum (Pt), or gold (Au).

Specifically, the second transition metal may be a transition metal other than the precious metal. More specifically, the second transition metal may be cobalt (Co), nickel (Ni), iron (Fe), copper (Cu), manganese (Mn), or a mixture thereof, and may be, for example, nickel (Ni) or copper (Cu).

Specifically, x may be 70 or less, for example, 60 or less, or 50 or less, or 40 or less.

According to one embodiment of the present disclosure, x and y may be numbers in which x is smaller than y.

The metal precursor for forming the metal nanoparticle may be selected from various types of compounds in accordance with the type of metal nanoparticles to be prepared.

For example, the metal precursor may include at least one type which can be selected from specific examples of palladium precursors such as palladium (II) bromide, palladium (II) sulfate, palladium (II) iodide, palladium (II) acetylacetonate, palladium (II) nitrate dehydrate, palladium (II) chloride, palladium(II) acetate, potassium hexachloroepalate (IV), potassium tetrachloropalladate (II), ammonium hexachloropalladate (IV), tetrachloropalladate (II) sodium, and the like.

In addition, the metal precursor may include at least one type which can be selected from specific examples of copper precursors such as copper sulfate (II), copper acetate (II), copper fluoride (II), copper bromide (II), acetylacetonate copper (II), copper chloride (II), copper (II) nitrate trihydrate, and the like.

In addition, the metal precursor may include at least one type which can be selected from specific examples of nickel precursors such as $NiCl_2 \cdot xH_2O$, $(CH_3COO)_2Ni \cdot xH_2O$, nickel (II) acetylacetonate, nickel (II) carbonate hydroxide, nickel (II) hydroxide, $Ni(NO_3)_2 \cdot xH_2O$, $NiSO_4 \cdot xH_2O$, $NiI_2$, $NiF_2$, and the like.

In addition, the metal precursor may include at least one type which can be selected from specific examples of iridium precursors such as $IrCl_3$, $IrCl_3 \cdot xH_2O$, $IrCl_4$, $IrBr_3$, $IrBr_4$, $IrI_4$, ammonium hexachloroiridate (III), ammonium hexachloroiridate (IV), potassium hexachloroiridate (III), potassium hexachloroiridate (IV), sodium hexachloroiridate (III), sodium hexachloroiridate (IV), and the like.

In addition, the metal precursor may include at least one type which can be selected from specific examples of gold precursors such as $HAuCl_4 \cdot xH_2O$, $Au(OH)_3$, $AuCl_3$, $AuCN$, and the like.

In addition, the metal precursor may include at least one type which can be selected from specific examples of iron precursors such as $(CH_3COO)_2Fe$, iron (III) acetylacetonate, iron (III), $FeCl_2 \cdot 4H_2O$, $FeCl_2$, $FeCl_3 \cdot 6H_2O$, $Fe(NO_3)_2$, $FeC_2O_2$, $FeSO_4$, $FeI_2$, $FeF_2$, and the like.

Further, the metal precursor may include at least one type which can be selected from specific examples of cobalt precursors such as cobalt oxide, $CoO$, $CoCl_2 \cdot 6H_2O$, $CoSO_4$, and the like.

Furthermore, the metal precursor may include at least one type which can be selected from specific examples of platinum precursors such as $H_2PtCl_6$, $H_2PtCl_4$, $K_2PtCl_6$, $K_2PtCl_4$, $PtCl_2(NH_3)_4$, and the like.

Moreover, depending on the type of metal included in the prepared nanoparticle catalyst, the metal precursor may include a ruthenium (Ru) precursor, a rhodium (Rh) precursor, a titanium (Ti) precursor, a chromium (Cr) precursor, a manganese (Mn) precursor, a gallium (Ga) precursor, a zirconium (Zr) precursor, a hafnium (Hf) precursor, or an osmium (Os) precursor, and the examples are not limited thereto, and a metal precursor that can be used in the art may be used.

The stabilizer can be selected from polyvinylpyrrolidone (PVP), polyethyleneimine (PEI), cetrimonium bromide (CTAB), polyethylene glycol (PEG), and the like.

FIG. 1 schematically shows a flow of fluid in a continuous Couette-Taylor reactor. The Taylor vortex flow is an inherent fluid motion of a periodic toroidal circular flow, and may be formed when a difference in rotational speed (rpm) between two coaxial cylinders is greater than or equal to a critical speed. Referring to FIG. 1, specifically, the Taylor vortex flow may be formed in the Couette-Taylor reactor shown in FIG. 1, and a Taylor vortex flow is formed inside the reactor when the internal cylinder is rotated at a critical speed or more while the outer cylinder is fixed. The Taylor vortex flow is a turbulence flow, which occurs when the number of Taylor Ta exceeds a threshold value, and specifically, is formed when Ta/Tac is 1 or more, thereby effectively preparing nanoparticle and dispersing the prepared nanoparticles in a fluid. In this case, Ta may be obtained through the following Equation 1, and Tac may be obtained by using the following Equations 2 and 3.

$$Ta = \omega_i^2 r_i (r_o - r_i)^3 / v^2 \qquad \text{[Equation 1]}$$

$$Ta_c(Re_z \neq 0) = Ta_{c0} + 26.5 * Re_z^2 \qquad \text{[Equation 2]}$$

$$Re_z = V_z d/v = Qd/Av = Q/\pi(r_i + r_o)v \qquad \text{[Equation 3]}$$

In Equations 1 to 3, $\omega_i$ is an angular velocity of the inner cylinder of the reactor, $V_z$ is an axial velocity of the fluid, d is the distance between the inner cylinder and the outer cylinder, v is a kinematic viscosity of the fluid, Q is a flow rate, and A is a cross-sectional area of the channel.

For example, when the flow rate of the continuous Couette-Taylor reactor is 6.1 ml/min, and for Ta/Tac of 9 or higher, nanoparticles can be effectively prepared and dispersed at a rotational speed of 731 rpm or higher.

In a conventional method for preparing dispersed nanoparticles, a method of dispersing nanoparticles by performing agitation with a batch reactor is used. However, in the agitation in the batch reactor, it is difficult to produce nanoparticles since the dispersion effect of particles is insignificant despite a high rotation speed. In contrast, in the case of the dispersing method of the present disclosure, nanoparticles formed using the continuous Couette-Taylor reactor in which Taylor vortex flow can be formed are effectively dispersed, which makes it easy to synthesize dispersed nanoparticles with a high active area. In addition, by using the continuous reactor, it is possible to improve production efficiency, and to easily synthesize dispersed nanoparticles even at a relatively low rotational speed (rpm).

In general, the synthesis of nanoparticles is carried out in an aqueous solution. Further, since fluid kinematic viscosity is included as a factor as in Equations 1 to 3 in order to form the Taylor vortex flow, the Taylor vortex flow is preferably a liquid flow rather than a gas with a low fluid kinematic viscosity.

A precursor of nanoparticles may be introduced into a liquid with the Taylor vortex flow to form nanoparticles in the liquid with the Taylor vortex flow, and in this case, nanoparticles with excellent dispersibility can be formed due to the flow of the fluid with a chemical reaction.

The dispersion and sizes of nanoparticles formed by controlling the Taylor vortex flow of the fluid in which the chemical reaction to synthesize the nanoparticles proceeds may vary, and thus the dispersion and sizes of nanoparticles may be controlled by controlling the Taylor vortex flow.

As a specific method of controlling the Taylor vortex flow, the Taylor vortex flow is formed by setting the rotation speed (rpm) of the continuous Couett-Taylor reactor above the critical speed, and the dispersion and sizes of nanoparticles formed by adjusting the rotation speed above the critical speed may be controlled.

Figure 5:
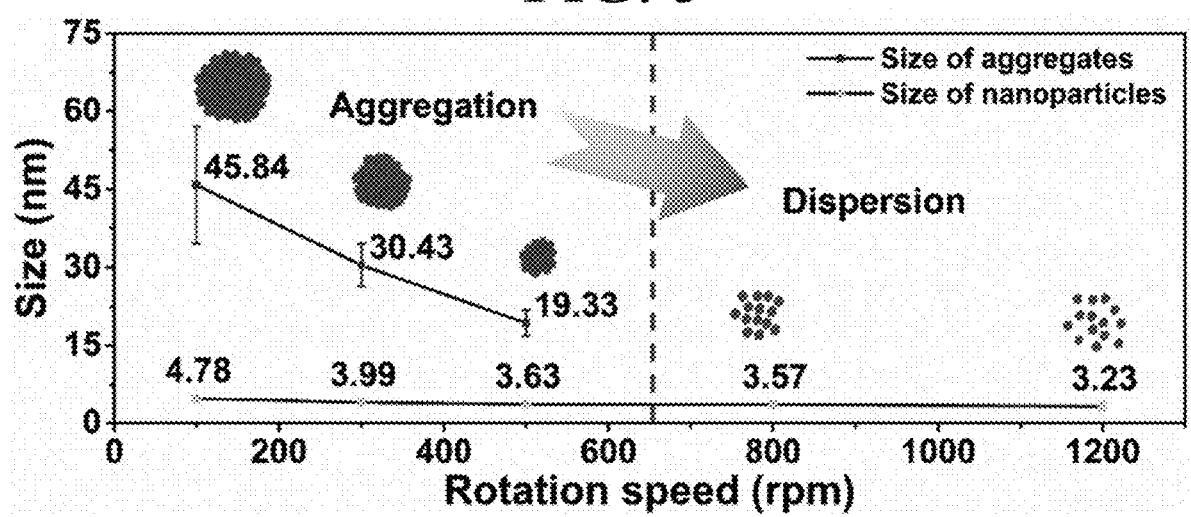
FIG. 5 shows sizes and dispersion of nanoparticles depending on a change in rotation speed in Examples of the present disclosure.
Figure 6A:
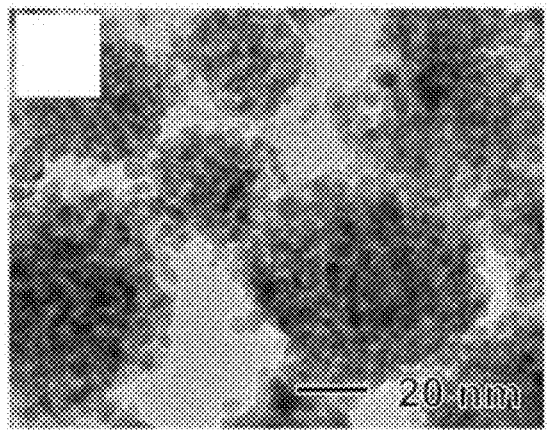
FIG. 6 shows transmission electron microscope (TEM) images of metal particles formed when rotation speeds are 100 rpm (6A), 300 rpm (6B), 500 rpm (6C), 800 rpm (6D), and 1200 rpm (6E) in Examples of the present disclosure.
Figure 6B:
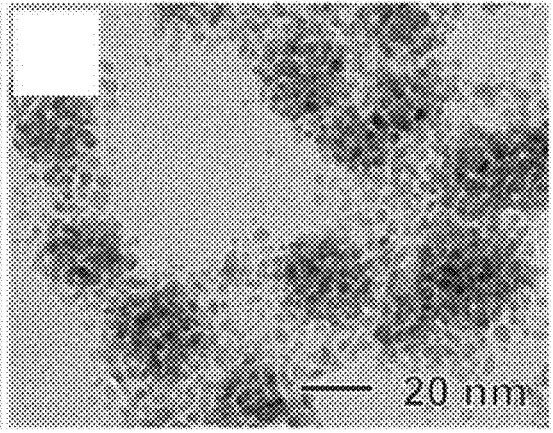
Figure 6C:
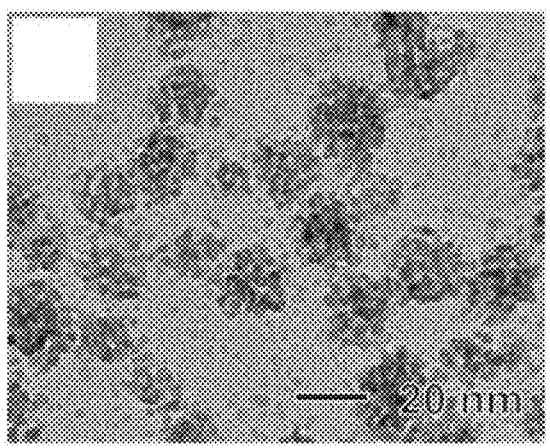
Figure 6D:
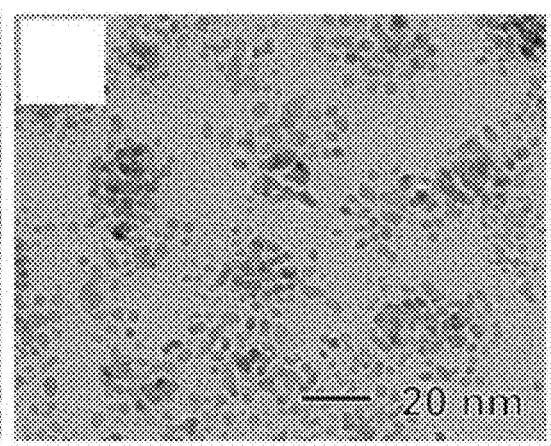
Figure 6E:
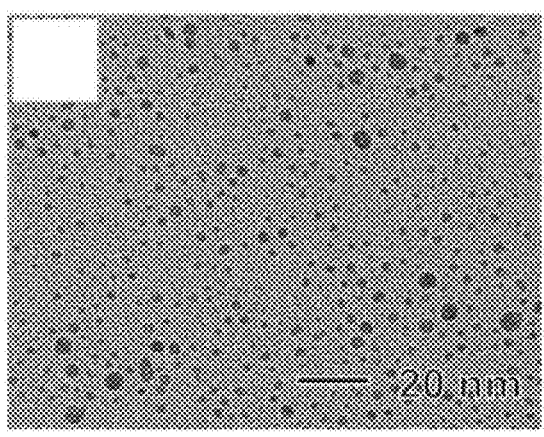

FIG. 5 shows the dispersion and sizes of nanoparticles formed depending on the rotation speed of the continuous Couett-Taylor reactor according to one embodiment of the present disclosure. FIG. 6 shows transmission electron microscope (TEM) images of CuPd nanoparticles formed when the rotation speeds are 100 rpm (6A), 300 rpm (6B), 500 rpm (6C), 800 rpm (6D), and 1200 rpm (6E) in one embodiment of the present disclosure. In this case, the dispersion of nanoparticles in FIG. 5 is shown by comparing the sizes of nanoparticle aggregates to which nanoparticles are physically bonded. Referring to FIGS. 5 and 6, as the rotation speed increases, the size of nanoparticle aggregates decreases, and the nanoparticles are effectively dispersed.

In addition, FIG. 23 shows TEM images of PdCu/C prepared in the continuous CT reactor and a change in size of PdCu/C depending on the rotation speeds of (23A) 100 rpm, (23B) 300 rpm, (23C) 500 rpm, (23D) 800 rpm, and (23E) 1200 rpm, respectively, according to one embodiment of the present disclosure. Referring to FIG. 6, as the rotation speed is increased from 100 rpm to 1200 rpm, the size of the nanoparticles is decreased from 5.2 nm to 2.9 nm. It may be seen that as the rotation speed increases, the size of the nanoparticles decreases, and the nanoparticles are effectively dispersed. Through this, it can be seen that the dispersion of the nanoparticles may be controlled only by controlling the rotation speed.

According to one embodiment of the present disclosure, the rotation speed of the continuous Couette-Taylor reactor may be 1 to 1,600 rpm, for example, 50 to 1,600 rpm, 100 to 1,500 rpm, 400 to 1,500 rpm, 600 to 1,400 rpm, or 800 to 1,300 rpm. As the rotation speed increases, the size of the nanoparticles decreases and the nanoparticles may be effectively dispersed. When the rotation speed is less than 1 rpm, the reaction may not be smoothly performed, and when the rotation speed is more than 1,600 rpm, it may not be economically efficient to produce a metal nanoparticle to rotation energy consumption.

As the method of controlling the dispersion and sizes of the formed nanoparticles, besides the control of the Taylor vortex flow, there is a method of controlling a mean residence time in the fluid in which the nanoparticles are formed and the Taylor vortex flow is formed.

As a specific example, the dispersion and sizes of nanoparticles may be controlled by controlling the mean residence time of nanoparticles in the continuous Couette-Taylor reactor in which nanoparticles are formed. According to one embodiment of the present disclosure, the mean residence time may be 1 minute to 1 hour, for example, 1 minute to 30 minutes, or 1 minute to 10 minutes.

Figure 10:
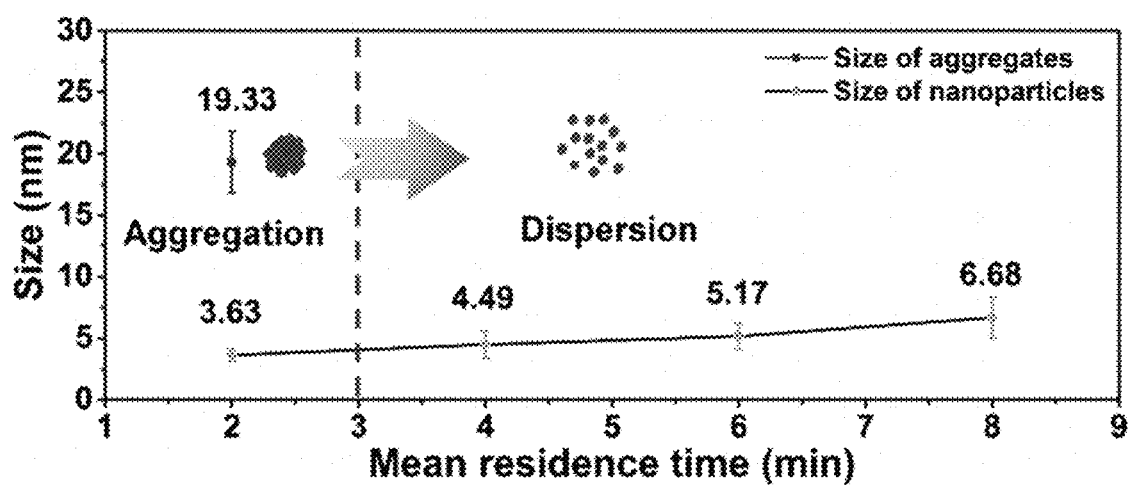
FIG. 10 shows dispersion and sizes of nanoparticles shown as the mean residence time (MRT) in Example of the present disclosure is increased.
Figure 11A:
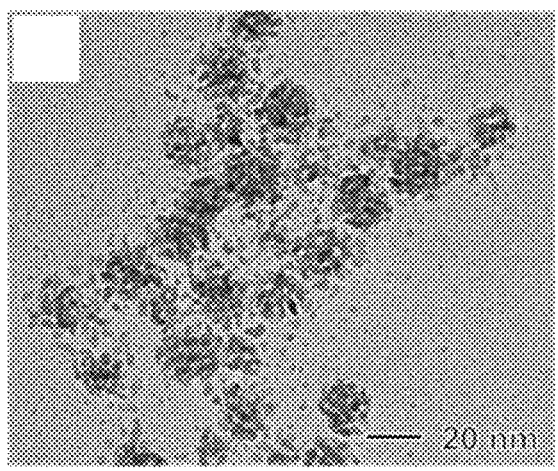
FIG. 11 shows TEM images of CuPd nanoparticles when the mean residence time in one embodiment of the present disclosure is 2 minutes (11A), 4 minutes (11B), 6 minutes (11C), and 8 minutes (11D).
Figure 11B:
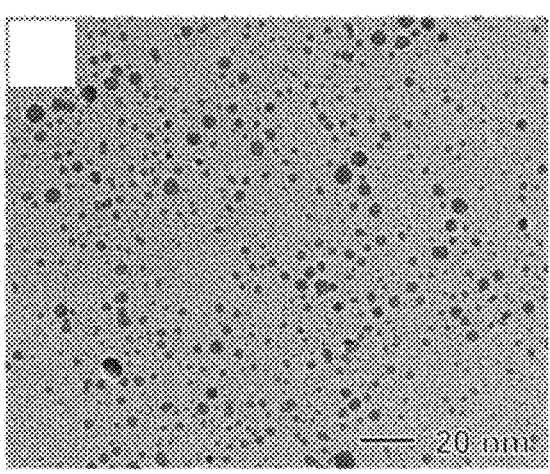
Figure 11C:
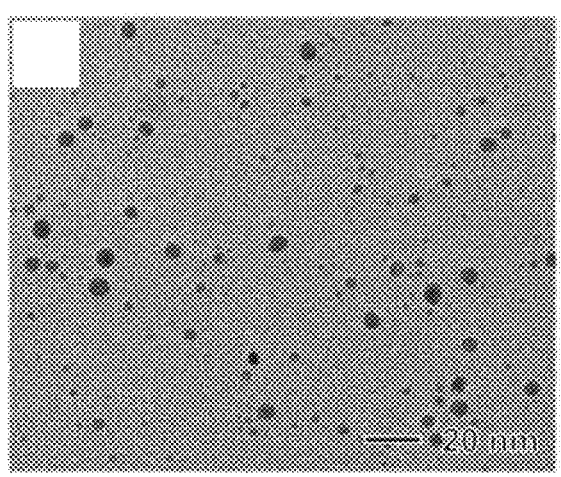
Figure 11D:
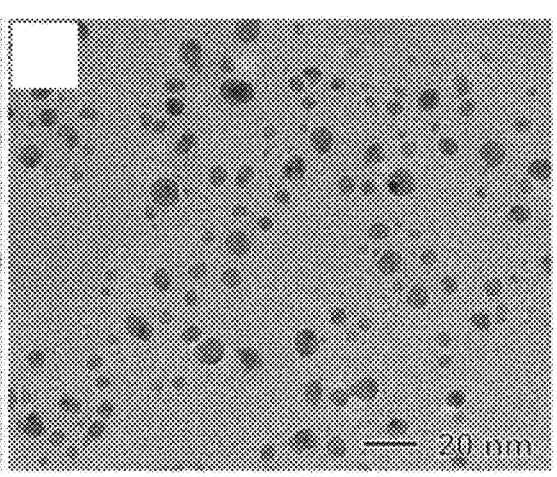

FIG. 10 shows dispersion and sizes of nanoparticles depending on the mean residence time (MRT) in the Couette-Taylor reactor in which the Taylor vortex flow of CuPd nanoparticles formed according to one embodiment of the present disclosure is formed, and FIG. 11 shows TEM images of CuPd nanoparticles formed when the mean residence time in the reactor in which the Taylor vortex flow of CuPd nanoparticles formed in the reactor according to one embodiment of the present disclosure is 2 minutes (11A), 4 minutes (11B), 6 minutes (11C), and 8 minutes (11D). In this case, the dispersion of nanoparticles in FIG. 10 is shown depending on the size of nanoparticle aggregates in which nanoparticles are physically bonded. Referring to FIGS. 10 and 11, the size of the nanoparticle aggregates is reduced in case that the mean residence time of CuPd nanoparticles inside the Couette-Taylor reactor is 4 minutes or more (11B, 11C, 11D) than 2 minutes (11A). Through this, the dispersion and sizes of nanoparticles can be controlled even by controlling only the mean residence time in the Taylor vortex flow of the formed nanoparticles. This is due to the properties of the continuous reactor in which the Taylor vortex flow is formed. As the mean residence time of the nanoparticles in the reactor increases, the concentration of the reactant (precursor) in the reactor decreases, and this can be interpreted that the supersaturation in the reactor is decreased, which increases the size of the nanoparticles while decreasing the number of particles.

The method for preparing the dispersed metal nanoparticle of the present disclosure more specifically may include: a step of introducing two or more kinds of nanoparticle metal precursors into the continuous Couette-Taylor reactor; a step where the continuous Couett-Taylor reactor forms a Taylor vortex flow, and the two or more kinds of nanoparticle metal precursors react to form nanoparticles in the reactor; and a step where the dispersion of the nanoparticles increases by the Taylor vortex flow.

In addition, according to one embodiment of the present disclosure, a step of introducing a support together with the two or more kinds of nanoparticle metal precursors may be further included.

Further, in accordance with one embodiment of the present disclosure, a step of adding a reducing agent to the reactant after the reaction step of the nanoparticle metal precursors may be further included. The reducing agent may include at least one selected from the group consisting of ascorbic acid, sodium hydroxide (NaOH), potassium hydroxide (KOH), hydrazine ($N_2H_4$), sodium hydrophosphate, glucose, tannic acid, dimethylformamide, tetrabutylammonium borohydride, sodium borohydride ($NaBH_4$), and lithium borohydride ($Li\ BH_4$).

When two or more kinds of nanoparticle precursors are introduced into the continuous Couett-Taylor reactor, the precursors form nanoparticles through a chemical reaction such as a reduction reaction in the continuous Couett-Taylor reactor in which the Taylor vortex flow is formed, and dispersed nanoparticles can be easily formed since the aggregation between nanoparticles is released due to the strong and regular Taylor vortex flow inside the reactor. Although the nanoparticles formed in the reactor are inherently easily aggregated due to the high surface area thereof, it is possible to produce nanoparticles with high dispersibility using only a small amount of stabilizer due to the Taylor vortex flow in the reactor.

Furthermore, according to one embodiment of the present disclosure, a support can be introduced together with the nanoparticle precursors, and the reaction may proceed while the nanoparticle precursors are attached to the support in the Taylor vortex flow, which makes it possible to produce nanoparticles with high dispersibility without a stabilizer.

The support may be at least one selected from the group consisting of a carbon-based support, a metal oxide-based support, a polymer support, and a zeolite-based support.

Specifically, the carbon-based support may be at least one selected from graphene, graphene oxide, reduced graphene oxide (rGO), graphite, super P, carbon nanotube (CNT), carbon nanobar, carbon nanoplate, carbon nanohorn, carbon fiber, carbon sheet, carbon black, activated carbon, ketjen black, carbon sphere, carbon ribbon, fullerene, and the like, but is not particularly limited thereto.

Specifically, the metal oxide-based support may be a porous metal oxide-based support, for example, zirconia, alumina, titania, silica ceria, or the like, but is not particularly limited thereto.

Specifically, the polymer support may be at least one selected from a conductive polymer support, for example, polyaniline, polypyrrole, polythiophene, and the like, but is not particularly limited thereto.

According to one embodiment of the present disclosure, the support may be a surface-unmodified carbon-based support, for example, surface-unmodified carbon black.

According to one embodiment of the present disclosure, the Taylor vortex flow may be to replace the stabilizer in the production of metal nanoparticles, and to disperse the nanoparticles on the support. If the support is included at the beginning of the reaction, the reaction proceeds in a state in which the metal precursor is attached to the support, so that the metal nanoparticles can be maintained in a dispersed state even after they are out of the flow.

According to one embodiment of the present disclosure, the metal nanoparticle may have a particle size of 0.5 to 10 nm, for example, 1 to 7 nm, 1 to 5 nm, or 1.5 to 4 nm. According to the production method of the present disclosure, it is possible to obtain a metal nanoparticle having a small particle size and effectively dispersed in a support.

The temperature of the continuous Couette-Taylor reactor can be operated below a boiling point and above a freezing point of a solvent used for the reaction. For example, in a reactor using water, the temperature of the reactor may be 0° C. to 100° C.

The field to which the Taylor vortex flow is applied through the continuous Couette-Taylor reactor in the process of forming nanoparticles is not particularly limited, and can be widely applied to a process for preparing a novel alloy nanocatalyst, a mass process of nanoparticles, or the like. In particular, the preparing method of the present disclosure can be effectively applied in fields where aggregation phenomenon of nanoparticles easily occurs due to electrostatic attraction, etc. and an excessive amount of stabilizer needs to be used. In one embodiment of the present disclosure, dispersibility and nanoparticle size were measured using copper-palladium (CuPd) alloy nanoparticles, which is a representative material with severe agglomeration (aggregation) after synthesis, as an example, but the application of the method for preparing dispersed metal nanoparticles of the present disclosure is not limited to the CuPd nanoparticles.

The size or dispersion of the metal nanoparticles can be controlled by controlling the concentration of the reactant. The reactant may be a metal precursor, an additive, for example, L-ascorbic acid.

Figure 12:
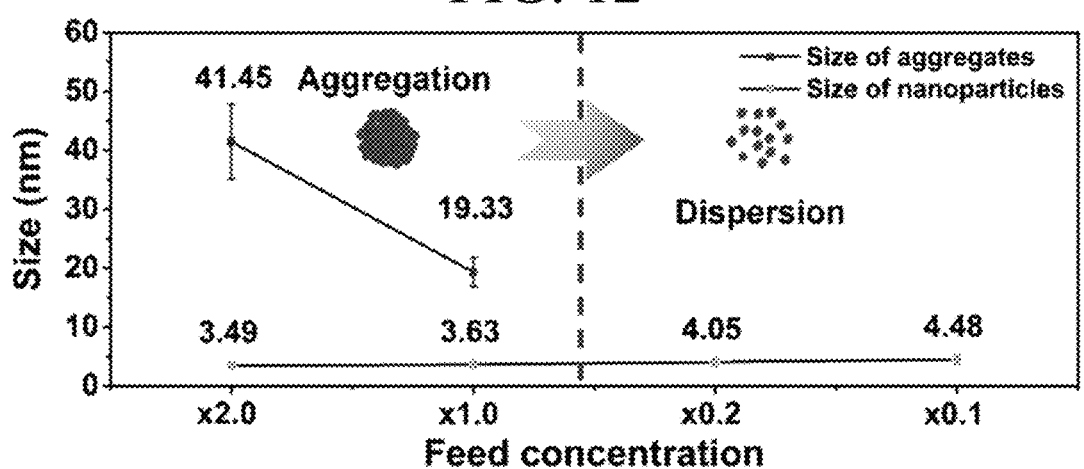
FIG. 12 shows comparison of dispersion and sizes of nanoparticles formed when a feed concentration is changed in Examples of the present disclosure.
Figure 13A:
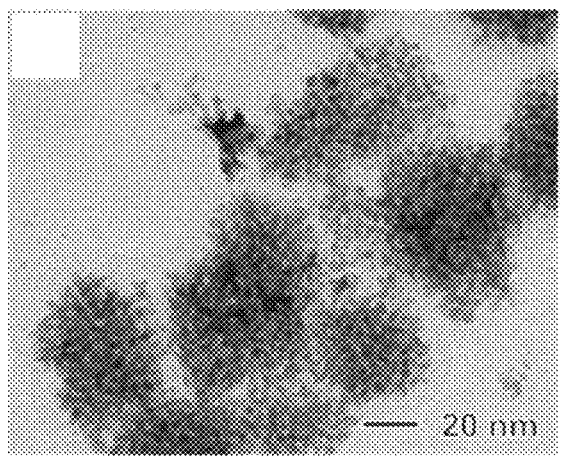
FIG. 13 shows TEM images of nanoparticles formed when the feed concentration is changed in Examples of the present disclosure.
Figure 13B:
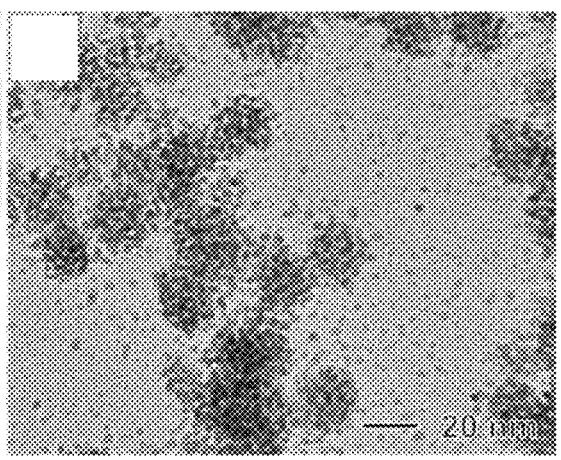
Figure 13C:
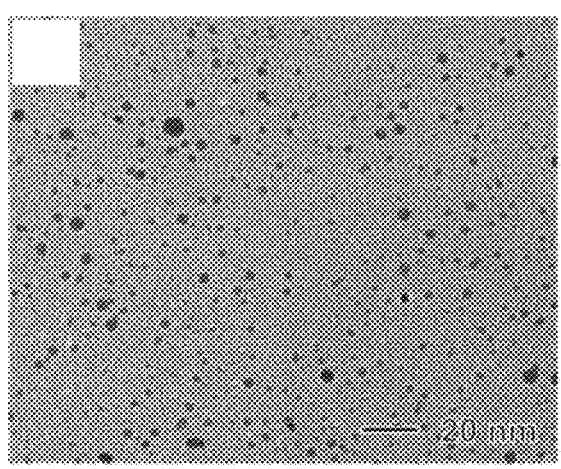
Figure 13D:
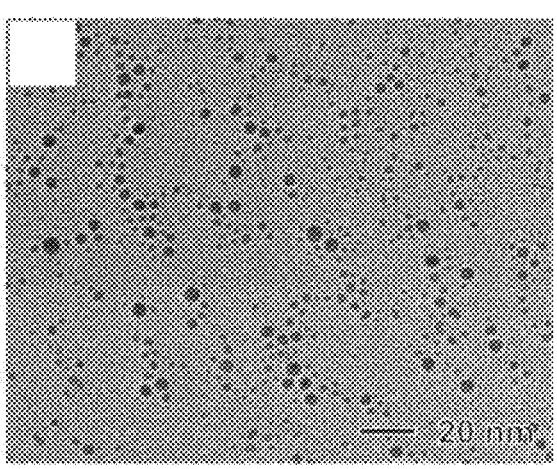

According to one embodiment of the present disclosure, it is possible to control the dispersion and sizes of nanoparticles formed by adjusting a feed concentration of the precursors of the nanoparticles. The feed concentration can be adjusted from 1.0 times to 0.01 times. FIG. 12 shows comparison of dispersion and sizes of nanoparticles formed by changing the feed concentration to 2 times (×2.0), ⅕ times (×0.2), and ⅒ times (×0.1) using the feed concentration used in the example carried out for the rotation speed comparison as a reference (×1.0), and FIG. 13 shows TEM images of nanoparticles formed depending on the feed concentration of reference (×1.0) (13A), 2 times (×2.0) (13B), ⅕ times (×0.2) (13C), and ⅒ times (×0.1) (13D) according to the feed concentration change. In this case, the dispersion of nanoparticles in FIG. 12 is shown by comparing the sizes of the nanoparticle aggregates in which the nanoparticles are physically bound. It can be seen through FIGS. 12 and 13 that the size of the nanoparticles increases as the feed concentration decreases, which can be interpreted as due to the decrease in supersaturation in the continuous reactor described above. In addition, referring to a, b, c, and d of FIG. 13, when only the feed concentration is reduced while the mean residence time is the same, the size of the nanoparticle aggregates is reduced, and the dispersibility is sharply increased in c and d in which the feed concentration is below a specific feed concentration.

According to one embodiment of the present disclosure, the dispersion and size of nanoparticles can be controlled by preparing PdCu/C catalysts with various Pd/Cu composition ratios (molar ratios) by changing the precursor concentrations of Pd and Cu of nanoparticles. When the molar ratio of Pd and Cu precursors was changed from 1:2 to 2:3, 1:1, and 2:1, the Pd/Cu molar ratio of prepared PdCu/C was adjusted from 36:64 to 41:59 55:45, and 69:31, respectively.

FIG. 20 shows TEM images of (20A) $Pd_{36}Cu_{64}/C$, (20B) $Pd_{41}Cu_{59}/C$, (20C) $Pd_{55}Cu_{45}/C$, (20D) $Pd_{69}Cu_{31}/C$, and (20E) Pd/C, and an HRTEM image (20F) of $Pd_{41}Cu_{59}/C$ depending on a composition ratio of PdCu/C prepared in the continuous CT reactor according to one embodiment of the present disclosure. FIG. 21 shows the size distributions of (21A) $Pd_{36}Cu_{64}/C$, (21B) $Pd_{41}Cu_{59}/C$, (21C) $Pd_{55}Cu_{45}/C$, (21D) $Pd_{69}Cu_{31}/C$, and (21E) Pd/C nanoparticles, and the size change (21F) of PdCu/C nanoparticles prepared in the continuous CT reactor.

The TEM images of FIG. 20 show that all the nanoparticles are well dispersed on the surface of the carbon particles. The size of the nanoparticles increased from 2.5 nm to 6.5 nm as the Pd content increased from 36 to 100 (FIG. 21). In addition, HRTEM analysis shows that the nanoparticles has a single crystal structure with high crystalline.

The molar ratio of palladium (Pd) may be 20 to 70 (when the sum of copper (Cu) molar ratio and palladium (Pd) molar ratio is 100). Preferably the molar ratio of palladium (Pd) may be 20 to 60 and more preferably 30 to 50 (the sum of copper (Cu) molar ratio and palladium (Pd) molar ratio is 100).

The dispersed metal nanoparticles according to another aspect of the present disclosure are prepared through the above-described nanoparticle synthesis method of the present disclosure, and since a stabilizer for improving dispersibility is used a little or not used in the process of preparing nanoparticles, the dispersed metal nanoparticles has high purity and wide active area.

Hereinafter, examples of the present disclosure will be described in detail so that those skilled in the art may easily implement the present disclosure, but this is only an example and the scope of the present disclosure is not limited by the following descriptions.

Example 1: Production of Cupd Alloy Nanoparticles Using Taylor Vortex Flow

In order to produce CuPd alloy nanoparticles, which is a typical material that can produce nanoparticles only through a large amount of stabilizer conventionally, sodium tetrachloropalladate (II) ($Na_2PdCl_4$), copper (II) nitrate trihydrate ($Cu(NO_3)_2$), L-ascorbic acid and polyvinylpyrrolidone (PVP, MW=10,000) were purchased from Sigma Aldrich and used without further purification.

Figure 2:
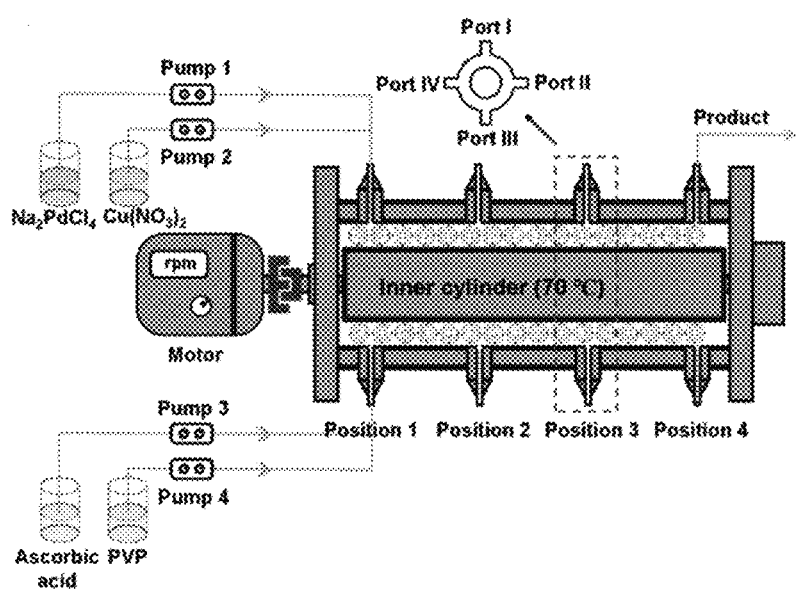
FIG. 2 schematically shows a process of preparing CuPd nanoparticles according to one embodiment of the present disclosure.

FIG. 2 schematically shows a process of preparing CuPd nanoparticles according to one embodiment of the present disclosure. Referring to FIG. 2, the continuous Couett-Taylor reactor (hereinafter referred to as the 'CT reactor') has at one end four inlet ports for $Na_2PdCl_4$, $Cu(NO_3)_2$, L-ascorbic acid and PVP feed solutions and at the other end one outlet port for product suspension. The dimensions of the CT reactor used in the present example are as shown in Table 1 below, such as the lengths and diameters of the inner and outer cylinders, the gap between the two cylinders, and the working volume.

TABLE 1

| Parameter | Dimension |
|---|---|
| Outer cylinder radius ($r_o$) | 20.78 mm |
| Inner cylinder radius ($r_i$) | 20.00 mm |
| Inner cylinder length (L) | 120 mm |
| Gap size (d) | 0.78 mm |
| Working volume (V) | 12.2 mL |

The critical Taylor number (Tac) representing the boundary between a Couette laminar flow that is a laminar flow and a Taylor vortex flow that is a turbulent flow is determined by radii of the inner and outer cylinders and an axial velocity of the CT reactor, and Tac0 (Critical Taylor number at axial Reynolds number Rez=0) is estimated to be 1737.55.

In this example, the CT reactor was initially filled with distilled water for the synthesis of the CuPd alloy nanoparticles, and then a Cu precursor solution ($Cu(NO_3)_2$), a Pd precursor solution ($Na_2PdCl_4$), an L-ascorbic acid solution, and a PVP solution were separately supplied to the CT reactor through the respective inlet ports.

The concentrations and flow rates of the four feed solutions to the CT reactor were as shown in Table 2 below, the mean residence time (MRT) in the CT reactor was 2 minutes, and the reaction temperature of the CT reactor was fixed at 70° C. The sample suspension containing the CuPd alloy nanoparticles was obtained through the outlet port after MRT at least 10 times to achieve a steady state. The obtained CuPd alloy nanoparticle product was centrifuged and washed three times with water. The prepared nanoparticles were then redispersed in water.

TABLE 2

| Feed solution | Concentration | Flow rate |
| --- | --- | --- |
| $Cu(NO_3)_2$ | 7.5 mM | 1.4 mL/min |
| $Na_2PdCl_4$ | 5.0 mM | 1.4 mL/min |
| L-ascorbic acid | 95 mM | 2.8 mL/min |
| PVP | 9 mM | 0.5 mL/min |
| Total flow rate of feed solution | — | 6.1 mL/min |

Example 2: Production of Cupd Alloy Nanoparticles Using Taylor Vortex Flow

In order to produce CuPd alloy nanoparticles, which is a typical material that can produce nanoparticles only through a large amount of stabilizer conventionally, sodium tetrachloropalladate (II) ($Na_2PdCl_4$, 99%) and copper (II) nitrate trihydrate ($Cu(NO_3)_2 \cdot 3H_2O$, 99%), L-ascorbic acid and polyvinylpyrrolidone (PVP, MW=10,000), sulfuric acid ($H_2SO_4$, 98%), formic acid (HCOOH, 96%), ethyl alcohol (99.5%), Nafion 117-containing solution (5%), and commercial Pd/C (Pd 10% by weight) were purchased from Sigma Aldrich and used without further purification. The Vulcan XC-72 (carbon black) was purchased from Macklin.

Figure 19:
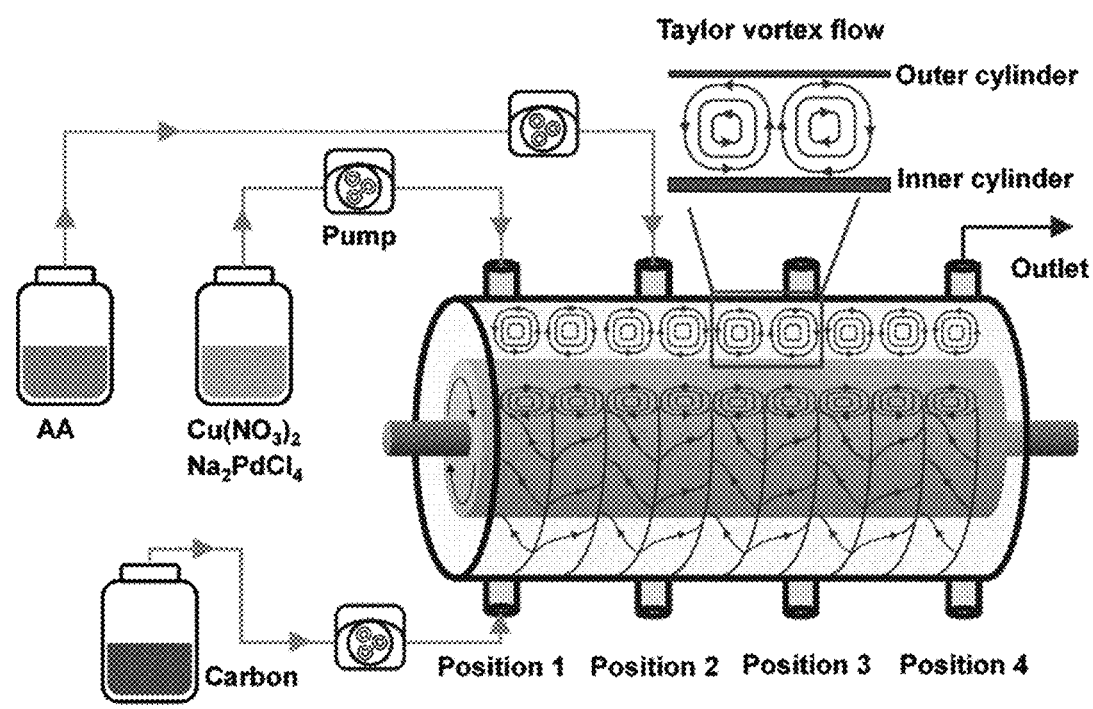
FIG. 19 schematically shows a process of preparing a PdCu/C metal catalyst without a stabilizer using a continuous Couette-Taylor reactor (hereinafter, also referred to as continuous CT reactor).
Figure 20A:
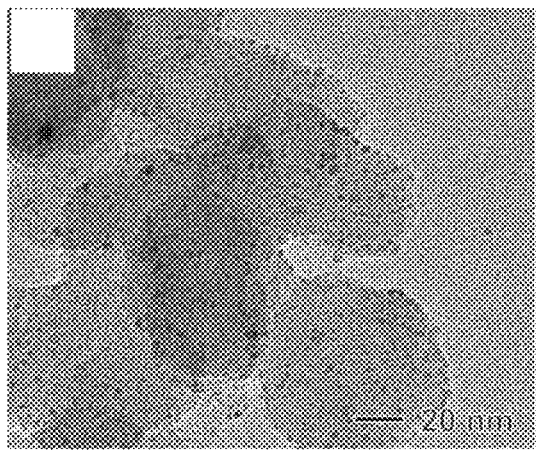
FIG. 20 shows TEM images (20A) to (20E) depending on a composition ratio of PdCu/C prepared in the continuous CT reactor and an HRTEM image (20F) of $Pd_{41}Cu_{59}/C$ in Examples of the present disclosure.
Figure 20B:
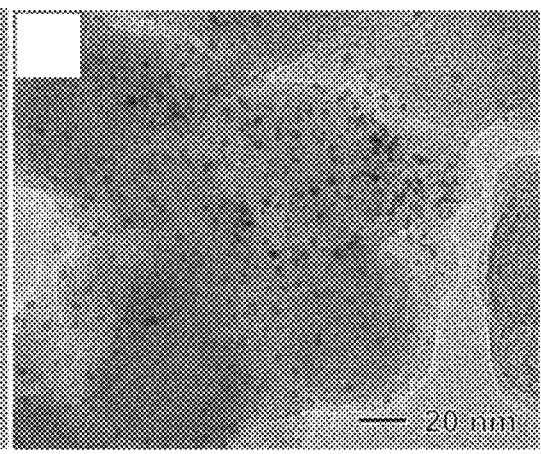
Figure 20C:
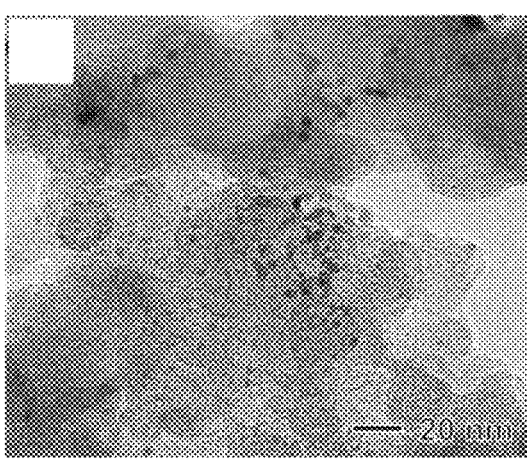
Figure 20D:
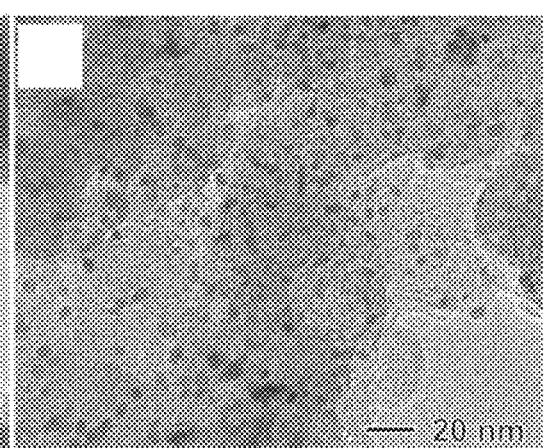
Figure 20E:
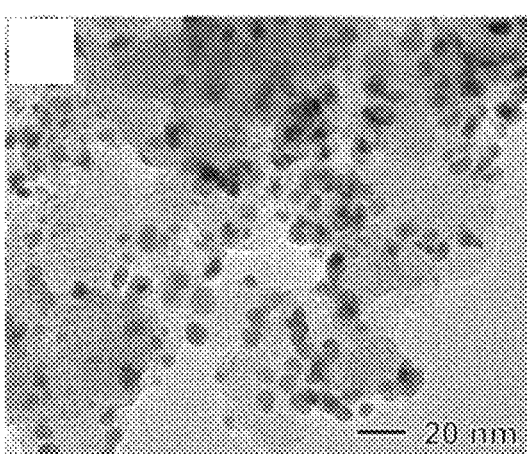
Figure 20F:
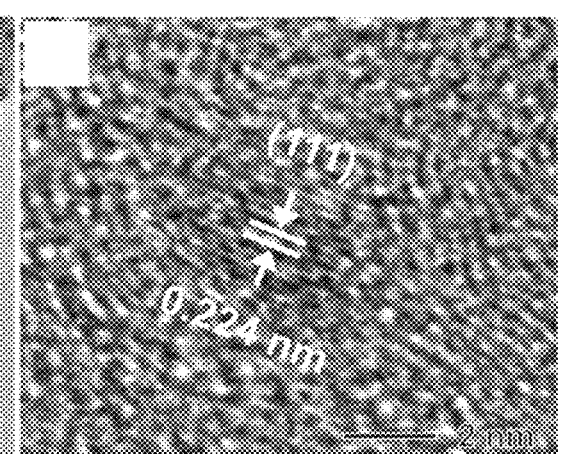
Figure 21A:
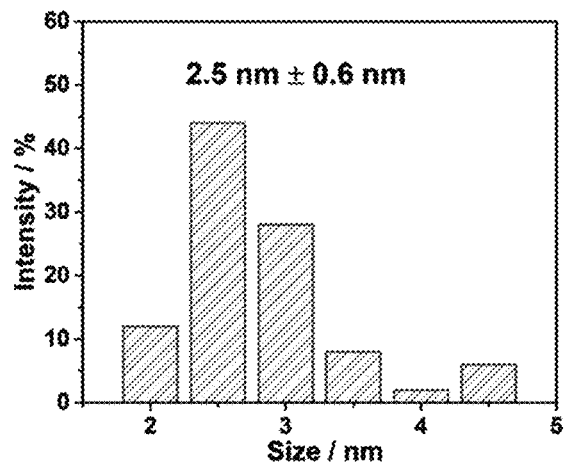
FIG. 21 shows the size distributions of (21A) $Pd_{36}Cu_{64}/C$, (21B) $Pd_{41}Cu_{59}/C$, (21C) $Pd_{55}Cu_{45}/C$, (21D) $Pd_{69}Cu_{31}/C$, and (21E) Pd/C nanoparticles, and the size change (21F) of PdCu/C nanoparticles prepared in the continuous CT reactor.
Figure 21B:
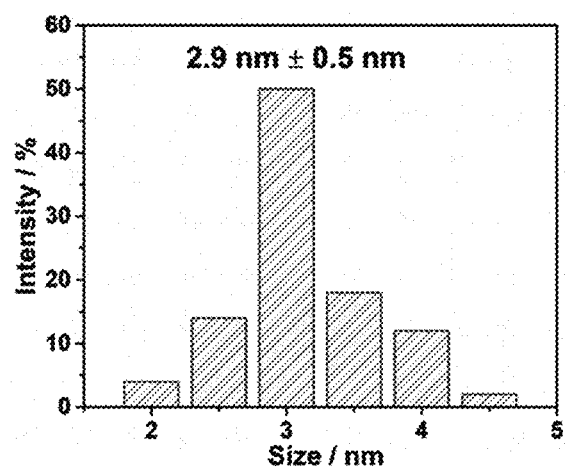
Figure 21C:
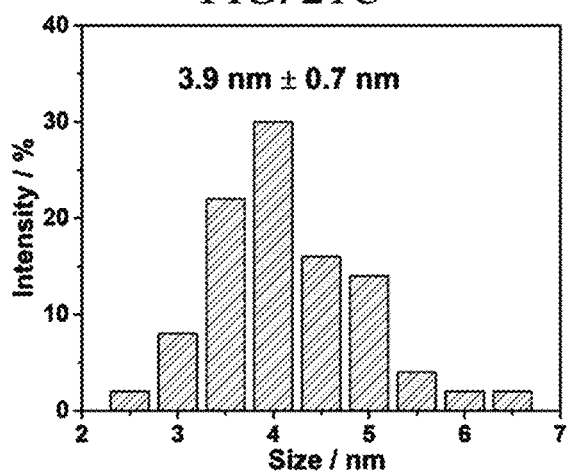
Figure 21D:
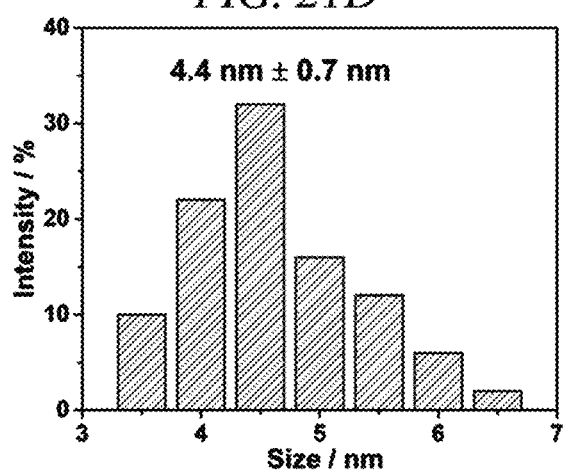
Figure 21E:
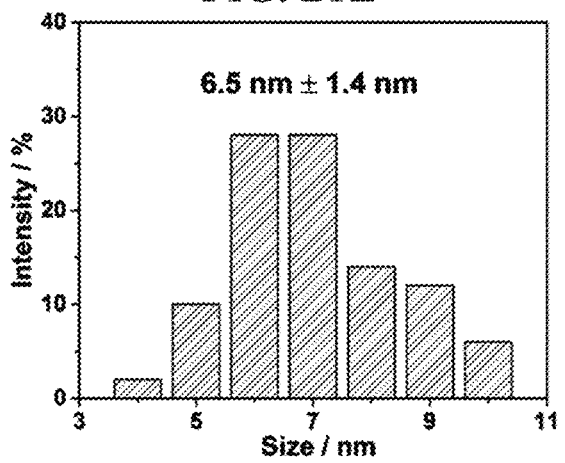
Figure 21F:
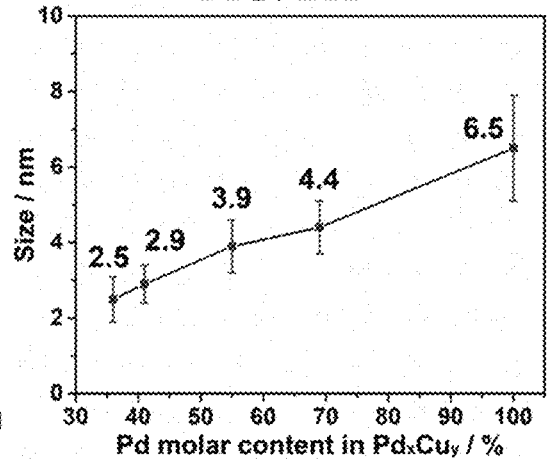
Figure 22A:
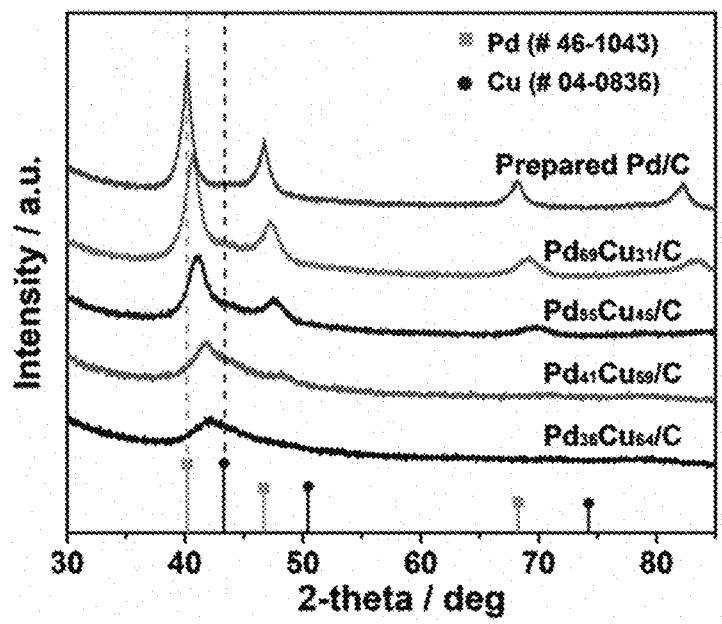
FIGS. 22A and 22B show a powder X-ray diffraction (XRD) spectrum and X-ray photoelectron spectroscopy (XPS) spectrums of $Pd_{41}Cu_{59}/C$ and commercial Pd/C depending on the PdCu/C composition ratio.
Figure 22B:
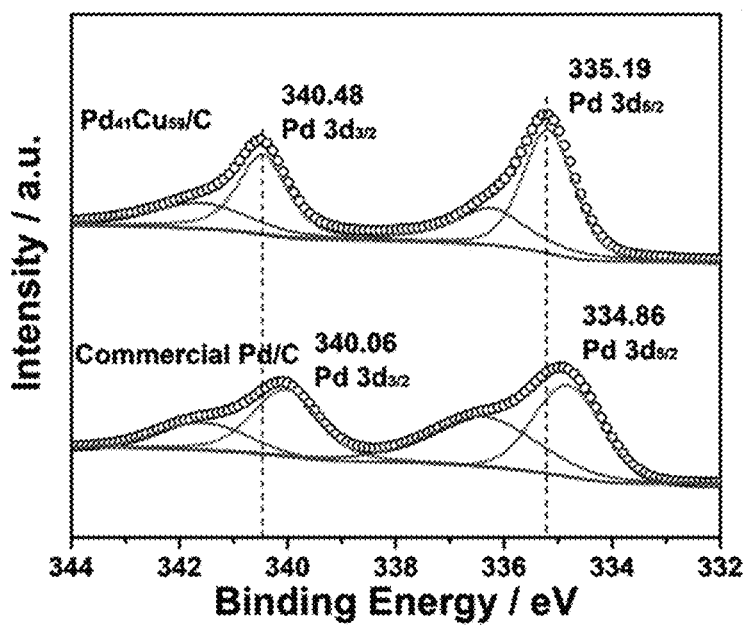
Figure 23A:
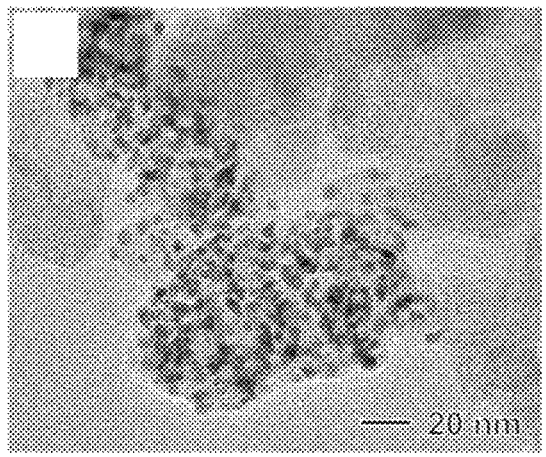
FIG. 23 shows TEM images of PdCu/C prepared in the continuous CT reactor according to rotational speed (23A) 100 rpm, (23B) 300 rpm, (23C) 500 rpm, (23D) 800 rpm, and (23E) 1200 rpm, respectively, in one embodiment of the present disclosure and size change (F) of PdCu/C are shown. (in order of (23A) to (23E), $Pd_{40}Cu_{60}/C$-100, $Pd_{43}Cu_{57}/C$-300, $Pd_{39}Cu_{61}/C$-500, $Pd_{43}Cu_{57}/C$-800, and $Pd_{41}Cu_{59}/C$-1200 and (20E) is the same as FIG. 20B)
Figure 23B:
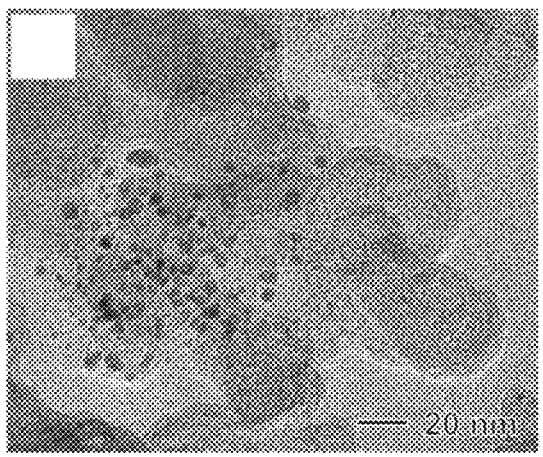
Figure 23C:
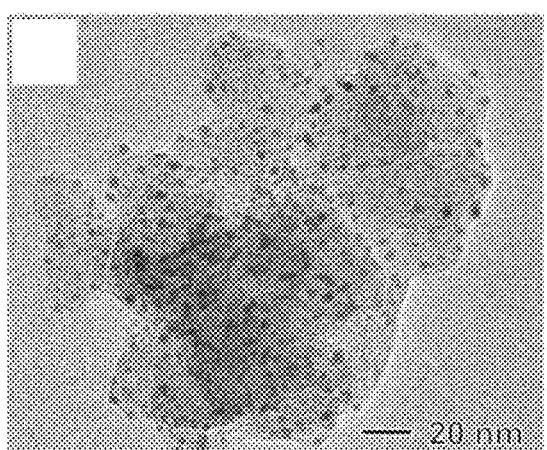
Figure 23D:
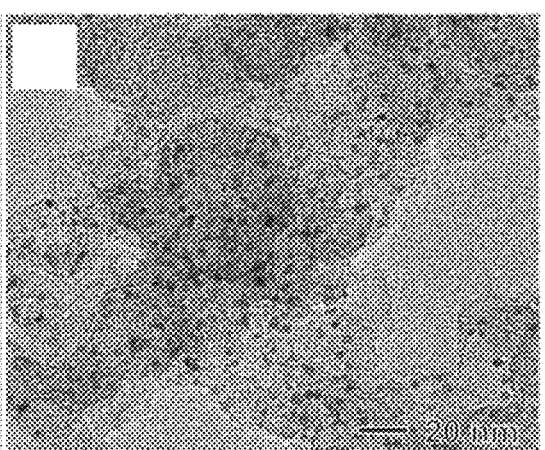
Figure 23E:
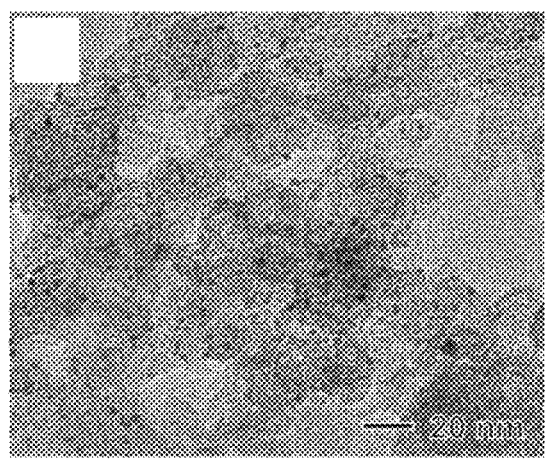
Figure 23F:
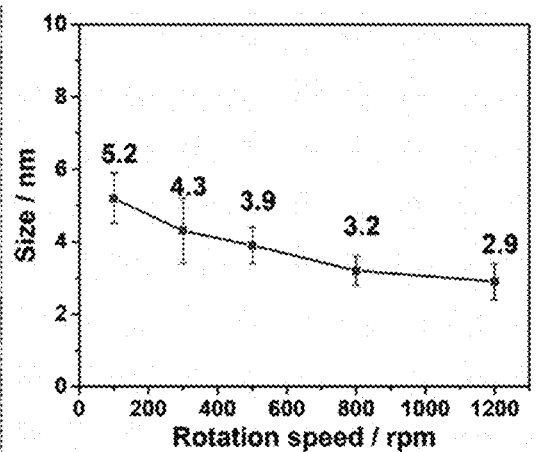
Figure 24A:
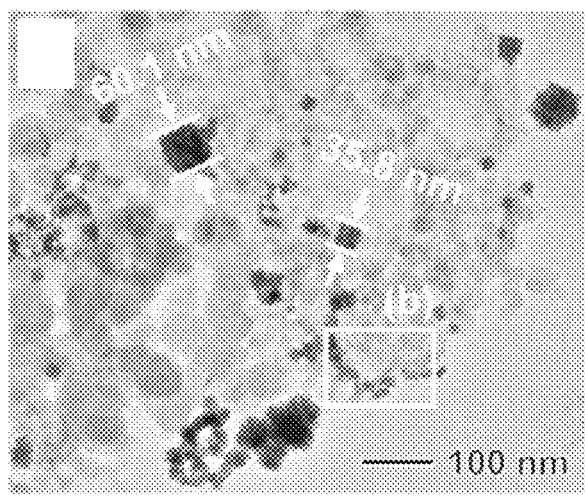
FIG. 24 shows TEM images (24A) and (24B) of $Pd_{43}Cu_{57}/C$-MT, a TEM image (24C) of $Pd_{42}Cu_{58}/C$-PVP, and size distribution (24D), which are comparative examples.
Figure 24B:
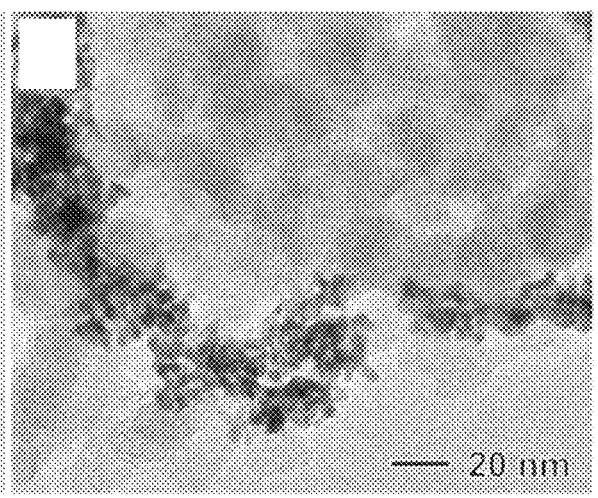
Figure 24C:
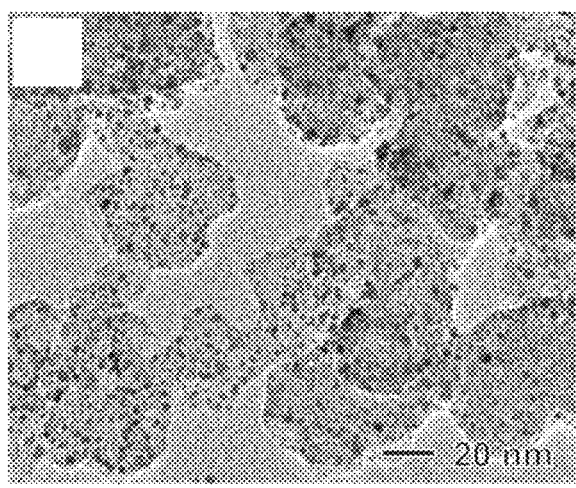
Figure 24D:
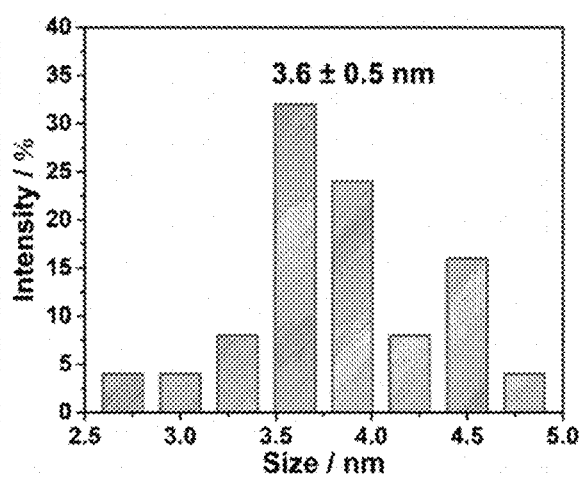

FIG. 19 schematically shows a process of preparing CuPd alloy nanoparticles according to one embodiment of the present disclosure. Referring to FIG. 19, a continuous Couette-Taylor reactor (hereinafter referred to as a "CT reactor") has at one end inlet ports for $Na_2PdCl_4$, $Cu(NO_3)_2$, L-ascorbic acid and support feed solutions, and one outlet port for a product suspension at the other end. The dimensions of the CT reactor used in this example are as shown in Table 1 above, such as the lengths and diameters of the inner and outer cylinders, the gap between the two cylinders, and the working volume.

In this example, the CT reactor was initially filled with distilled water for the synthesis of the CuPd alloy nanoparticles. Then, a suspension of carbon particles and a mixed reagent solution of $Na_2PdCl_4$ and $Cu(NO_3)_2 \cdot 3H_2O$ were individually injected into the CT reactor at position 1. The flow rates of the reagent mixture solution and the carbon particle suspension were 2.8 mL/min and 1.3 mL/min, respectively. Subsequently, the L-ascorbic acid solution (130 mM) was injected into position 2 of the CT reactor at a flow rate of 3.0 mL/min. Accordingly, the mean residence time (MRT) of the CT reactor was 2 minutes. The reaction temperature of the CT reactor was fixed at 80° C. The inner cylinder was rotated in the range of 100 to 1,200 rpm. The sample suspension containing the CuPd alloy nanoparticles was obtained through the outlet port after MRT at least 10 times to achieve a steady state. The obtained CuPd alloy nanoparticle product was centrifuged and washed several times with water. The prepared nanoparticles were then dried overnight at 25° C. in a vacuum oven.

Figure 3A:
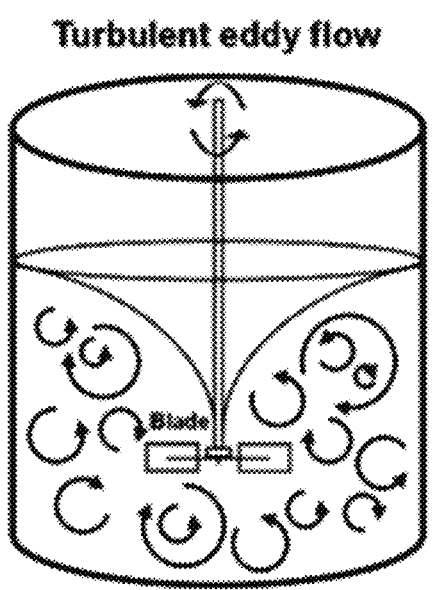
FIGS. 3A and 3B schematically show vortexes formed through a CSTR reactor of Comparative Example 1 and an MT reactor of Comparative Example 2, respectively.
Figure 4:
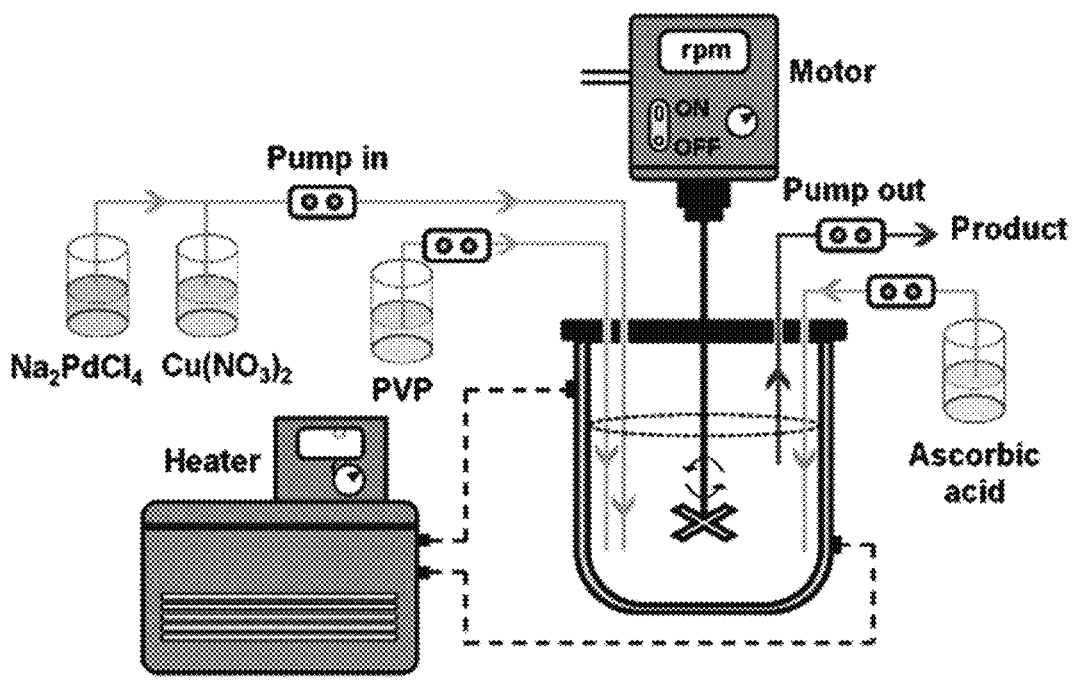
FIG. 4 schematically shows a process of the Comparative Examples.

Comparative Example 1: Production of CuPd Alloy Particles Using CSTR Reactor FIG. 3A schematically show a CSTR reactor (Continuous Stirred Tank reactor) and a vortex formed therethrough, respectively. By using the CSTR reactor as a representative of a continuous reactor using a conventional vortex, the comparative example 1 was performed under the experimental conditions that the concentration of the feed solutions, MRT (mean residence time) and reaction temperature are the same as those in the above example. FIG. 4 schematically shows a process of this comparative example. The CSTR reactor uses a 4-blade impeller, and has a specification in Table 3 below.

TABLE 3

| Parameter | Dimension |
| --- | --- |
| Impeller diameter ($D_a$) | 12.00 mm |
| Tank diameter ($D_t$) | 33.00 mm |
| Liquid depth in tank (H) | 16.50 mm |
| Impeller blade width (W) | 3.00 mm |
| Impeller blade length (L) | 3.35 mm |

Referring to FIG. 4, the reactor was first filled with 12.2 mL of water, heated to 70° C., and four supply solutions were injected into the reactor through four pumps. At the same time, the suspension product was pumped out of the reactor at a flow rate of 6.1 mL/min and MRT was 2 minutes. The sample was taken in a steady state and centrifuged to separate the nanoparticles to obtain CuPd alloy nanoparticles.

Comparative Example 2: Production of CuPd Nanoparticles Using MT Reactor

Figure 3B:
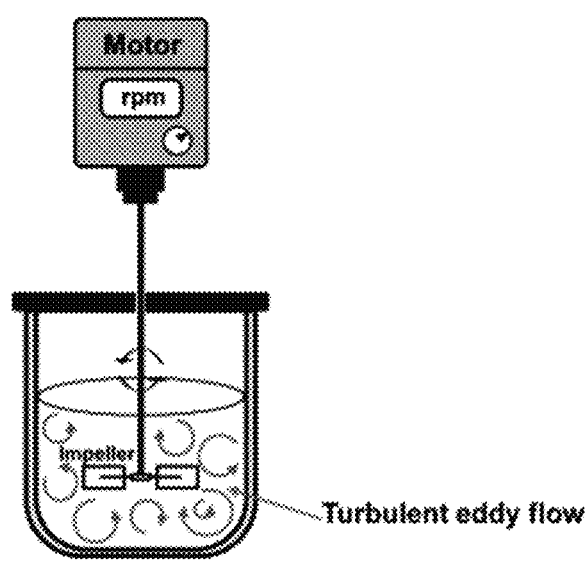

FIG. 3B schematically shows an MT reactor (Mixing Tank reactor) and a vortex formed therethrough. By using the MT reactor, 2.8 mL of $Na_2PdCl_4$ (2.4 mM), 2.8 mL of $Cu(NO_3)_2 \cdot 3H_2O$ (3.6 mM), and 2.6 mL of a carbon suspension (5.0 mg/mL) were added to the MT reactor (20 mL) and preheated under stirring at 80° C. for 5 min in an oil bath. Then, 4.0 mL of L-ascorbic acid (130 mM) was rapidly injected into the solution at an agitation speed of 3,000 rpm. After reacting at the same temperature for 2 minutes, the product was centrifuged and washed several times with water. The powder samples were dried overnight at 25° C. in a vacuum oven.

Experimental Example: Analysis of CuPd Alloy Nanoparticle Properties Depending on Reactor Type and Parameter Change The dispersion and sizes of CuPd alloy nanoparticles prepared by the methods of Example of the present disclosure and the comparative examples were measured and compared.

Transmission electron microscopy (TEM) and high resolution TEM (HRTEM) images were obtained using a JEM-2100F microscope (JEOL, Japan) operating at 200 kV, and energy dispersion spectroscopy (EDS) element mapping data were obtained using Oxford INCA.

The X-ray powder diffraction (XRD) pattern of the sample was obtained by using a D-MAX/A diffractometer (Rigaku, Japan) at 35 kV and 35 mA. X-ray photoelectron spectroscopy (XPS) measurement was performed with PHI 5000 VersaProbe (Ulvac-PHI) using monochromatic Al Kα X-rays. The elemental composition of the sample was characterized using an inductively coupled plasma mass spectrometer (ICP-MS) (Leeman, USA).

By using a thermogravimetric analyzer (TGA) (Q5000 IR), 8% of the loading capacity of PdCu nanoparticles for carbon black was confirmed.

The UV-vis absorption spectrum of the CuPd suspension was obtained through Cary 60 UV-vis spectrophotometer (USA).

Experimental Example 1-1: Comparison of CuPd alloy Nanoparticle Properties Depending on Rotation Speed Control in Example 1

In the process of preparing the CuPd alloy nanoparticles using the continuous CT reactor in Example 1, various flow regions were generated by adjusting the rotation speed of the inner cylinder from 100 rpm to 1200 rpm. FIG. 5 shows the dispersion and sizes of nanoparticles depending on a change in the rotation speed in Example 1.

Figure 7:
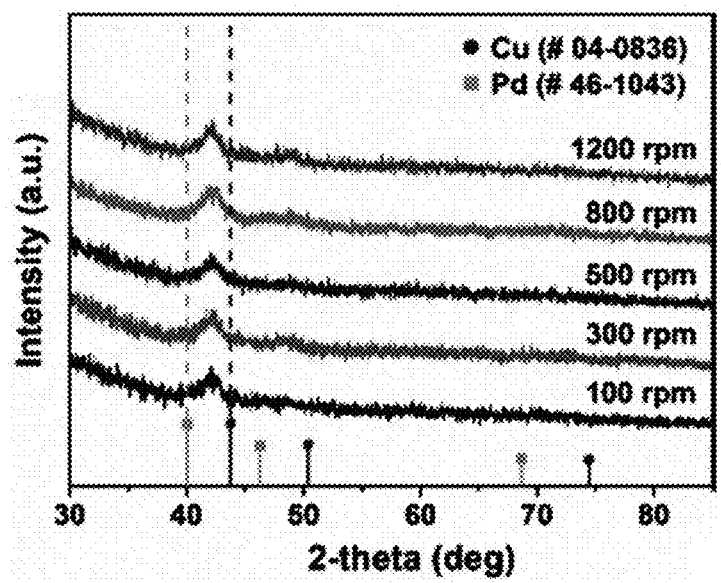
FIG. 7 shows a powder X-ray diffraction (XRD) spectrum of CuPd obtained by changing the rotation speed in Examples of the present disclosure.

First, powder X-ray diffraction (XRD) spectra of CuPd alloy nanoparticles obtained through respective rotational speeds are shown in FIG. 7. Referring to FIG. 7, the CuPd alloys formed at all rotation speeds in Example 1 are structurally located between the standard metal Cu (JCPDS #No. 04-0836) and Pd (JCPDS #No. 46-1043), and thus the CuPd alloys are well prepared at all rotation speeds.

FIG. 6 shows transmission electron microscope (TEM) images of metal particles formed when rotation speeds are 100 rpm (6A), 300 rpm (6B), 500 rpm (6C), 800 rpm (6D), and 1200 rpm (6E) in Example 1. Referring to FIG. 6, it can be clearly seen that the CuPd nanoparticles were severely agglomerated to a size of about 45.84 nm at the rotation speed of 100 rpm (6A). However, when the rotation speed of the CT reactor was increased to 500 rpm, the size of the nanoparticle aggregates rapidly decreased (6B). In addition, the nanoparticle aggregates were completely dispersed into individual nanoparticles at the rotation speed of 800 rpm or more (6D, 6E).

In addition, the size of the nanoparticles generated in the reactor changed depending on the rotational speed of the CT reactor. The size of nanoparticles composing aggregates as described above were 4.78 nm at the rotation speed of 100 rpm, and decreased to 3.23 nm as the rotation speed increased to 1200 rpm. The dependence of nanoparticle size on fluid motion is due to the facilitation of nucleation, so in fast reaction systems, the apparent reaction rate is generally determined by the micromixing of the reactants. Accordingly, as micro-mixing by rotation increased, the degree of supersaturation of the reactor increased, resulting in a higher nucleation rate and a smaller particle size. Accordingly, the size of the nanoparticles decreases as the rotation speed of the CT reactor increases.

Experimental Example 1-2: Comparison of CuPd Particle Properties Depending on Rotation Speed Control in Comparative Example 1

Referring to FIGS. 1 to 3, unlike the CT reactor (FIG. 1) of the Example in which the Taylor vortex flow TVF of a regular flow is formed, a turbulence eddy flow of the CSTR reactor of Comparative Example 1 is randomly generated (FIG. 3A).

For comparison with the CT reactor (Example), the effect of turbulent eddy flow on the aggregation and dispersion of nanoparticles in the CSTR (Comparative Example) was investigated. In this case, all experimental conditions of the CSTR were the same as those of the CT reactor in the above Example, except that the agitation speed of the CSTR varies from 700 rpm to 3000 rpm.

Figure 8:
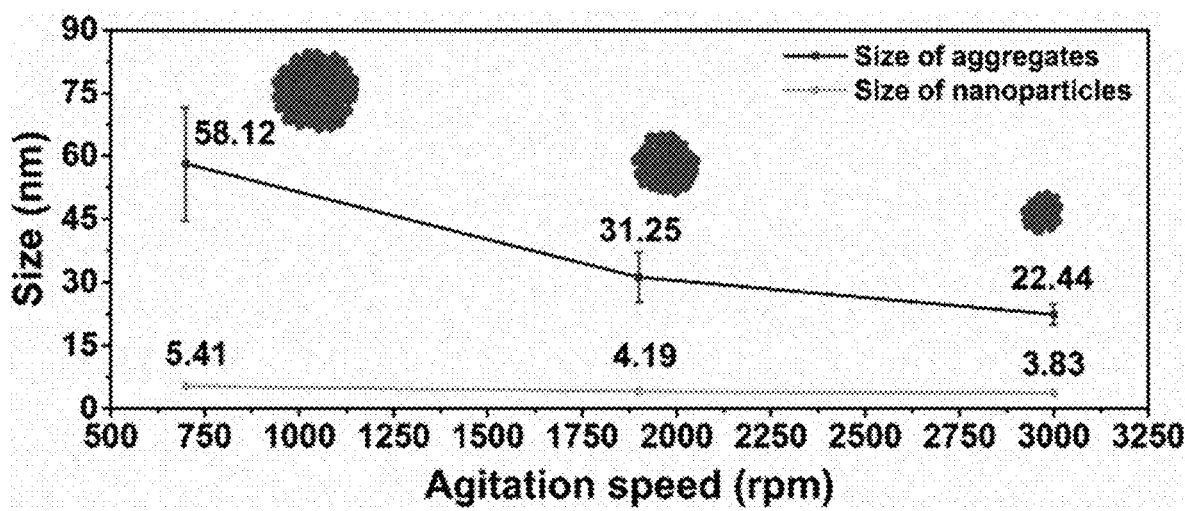
FIG. 8 shows dispersion and sizes of nanoparticles depending on an agitation speed in Comparative Example (CSTR).
Figure 9A:
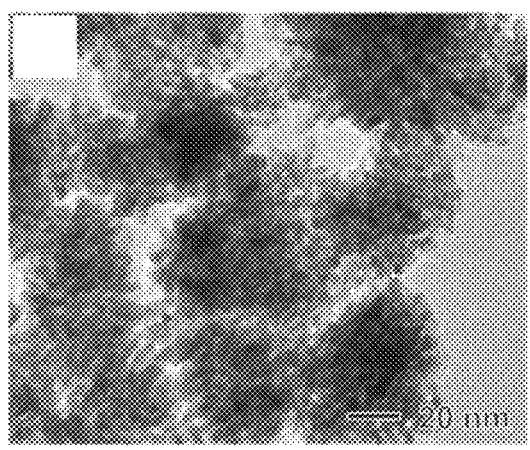
FIGS. 9A to 9C shows TEM images of agitation speeds at 700 rpm (9A), 1900 rpm (9B), and 3000 rpm (9C) in the Comparative Example.
Figure 9B:
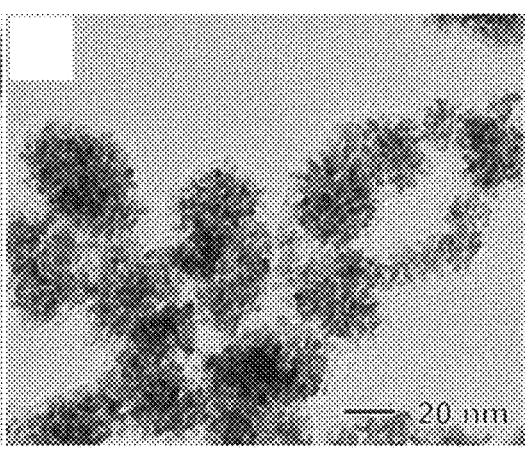
Figure 9C:
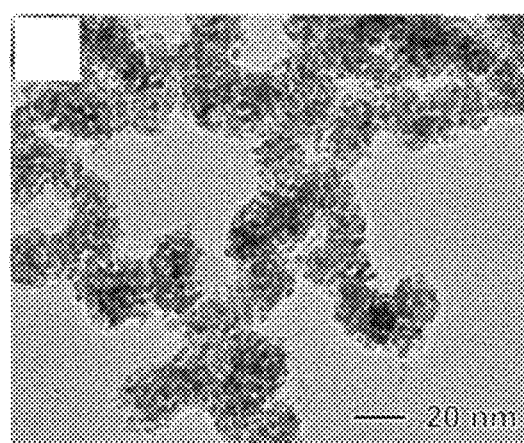

FIG. 8 shows dispersion and sizes of nanoparticles depending on an agitation speed in Comparative Example (CSTR), and FIG. 9 shows TEM images of agitation speeds at 700 rpm (9A), 1900 rpm (9B), and 3000 rpm (9C) in Comparative Example. Referring to FIG. 9, as the agitation speed of Comparative Example (CSTR) is increased, the size of the aggregate is decreased due to high fluid shearing, but it can be seen that the aggregates were not completely dispersed even at a high agitation speed of 3000 rpm. The size of nanoparticles decreased from 5.41 nm to 3.83 nm as the agitation speed increased from 700 rpm to 3000 rpm due to the improvement in micromixing. The tendency of nanoparticle size depending on the agitation speed was similar in the two reactors, but the nanoparticle size obtained from CT reactor was smaller than that of the CSTR, which means that the TVF made the reactant micromixing more effective than the turbulent vortex flow formed in the CSTR. In this Comparative Example, it was difficult to increase the agitation speed of the CSTR to 3000 rpm or more due to actual limitations of the reactor.

Experimental Example 2: Comparison of CuPd Particle Properties Depending on Mean Residence Time (MRT) Control in Example 1

The mean residence time (MRT) of the continuous CT reactor is an important parameter for nanoparticle dispersion. FIG. 10 shows dispersion and sizes of nanoparticles shown as the mean residence time (MRT) in Example 1 is increased, and FIG. 11 shows TEM images of CuPd alloy nanoparticles when the mean residence time in Embodiment 1 is 2 minutes (a), 4 minutes (b), 6 minutes (c), and 8 minutes (d). Referring to FIG. 11, serious aggregation of nanoparticles occurred in the CT reactor, resulting in 19.33 nm of aggregates at 2 minutes of MRT. However, referring to FIG. 10, in the experimental result of increasing the MRT to 4 minutes or more, completely dispersed nanoparticles with a size of 4.49 nm were observed. This result is because the nanoparticles were exposed to a constant shear field of the TVF for a long time, which increased the dispersion of the nanoparticles. When MRT was further increased up to 8 minutes, the nanoparticle size increased to 6.68 nm. In a continuous reactor, the concentration of reactants decreases as the feed flow rate decreases. Accordingly, the degree of supersaturation occurring in the CT reactor decreases as the MRT increases, resulting in a smaller number of nanoparticles and a larger size.

Experimental Example 3-1: Comparison of CuPd Particle Properties Depending on Feed Concentration Control in Example 1

In order to further investigate the effect of supersaturation on the dispersion and sizes of the CuPd nanoparticles in Example 1, the feed concentration was changed. FIG. 12 shows comparison of dispersion and sizes of nanoparticles formed by increasing the feed concentration to 2 times (×2.0), ⅕ times (×0.2), and ¹⁄₁₀ times (×0.1) with the feed concentration of Table 2 as a reference (×1.0), and FIG. 13 shows TEM images of nanoparticles depending on the feed concentration of reference (×1.0) (13A), 2 times (×2.0) (13B), ⅕ times (×0.2) (13C), and ¹⁄₁₀ times (×0.1) (13D) formed depending on the feed concentration change.

An increase in the feed concentration causes a high degree of supersaturation inside the reactor. The high degree of supersaturation produces high population and small-sized nanoparticles, and agglomeration is promoted as the population of nanoparticles increases and the size of nanoparticles decreases. Accordingly, when the feed concentration was twice the standard condition, the aggregate size increased significantly to 41.45 nm and the nanoparticle size decreased slightly to 3.49 nm (×2.0 in FIG. 12, a in FIG. 13A). Conversely, when the feed concentration was diluted by 5 times, 4.05 nm of completely dispersed nanoparticles were easily achieved in the CT reactor (×0.2 in FIG. 12, c in FIG. 13C). When the feed concentration was further diluted by 10 times, the nucleation rate was further reduced, so the nanoparticle size increased to 4.48 nm (×0.1 in FIG. 12, d in FIG. 13D).

Experimental Example 3-2: Comparison of CuPd Particle Properties Depending on Feed Concentration Control in Comparative Example 1

Figure 14:
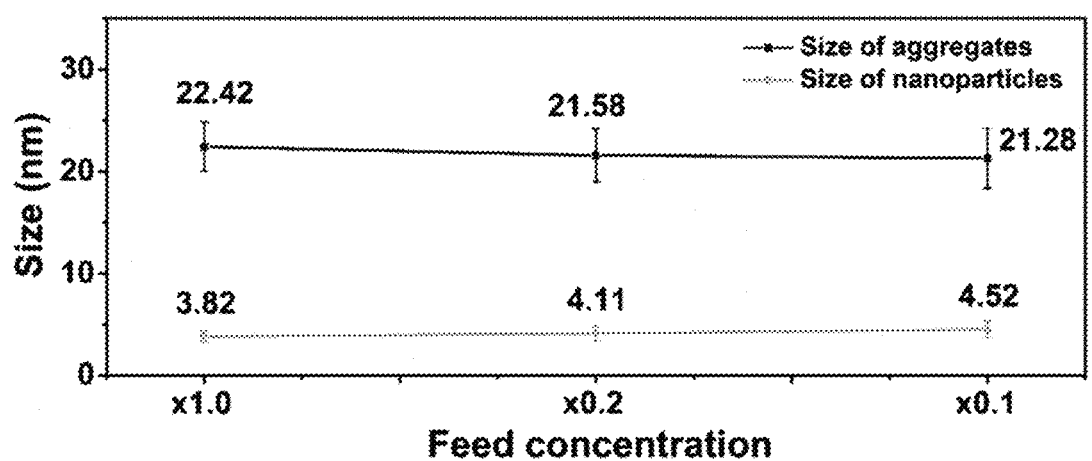
FIG. 14 shows dispersion and sizes of nanoparticles depending on the feed concentration control when the agitation speed is constant at 3000 rpm in the Comparative Example (CSTR).
Figure 15A:
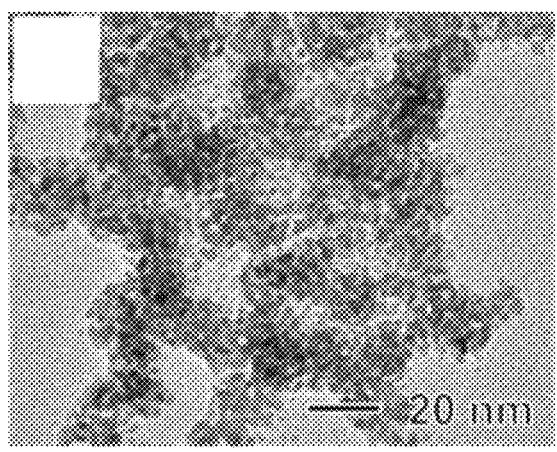
FIG. 15 shows TEM images of nanoparticles depending on the feed concentration control when the agitation speed is constant at 3000 rpm in the Comparative Example (CSTR).
Figure 15B:
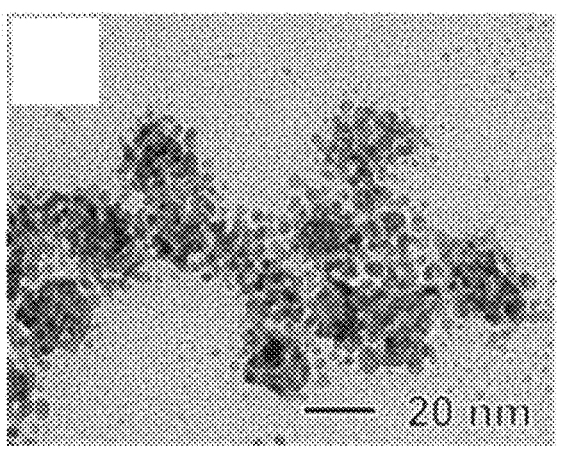
Figure 15C:
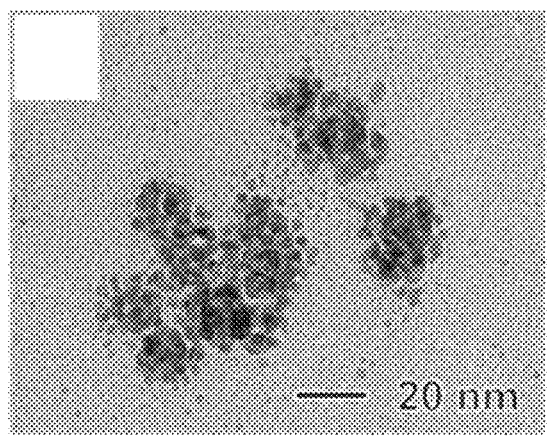

FIG. 14 shows the dispersion and sizes of nanoparticles depending on the feed concentration control when the agitation speed is constant at 3000 rpm in the CSTR of Comparative Example 1, and shows nanoparticle aggregation and dispersion when the feed concentration was diluted by 5 times (×0.2) and 10 times (×0.1) with the feed concentration as shown in Table 2 as a reference (×1.0). FIG. 15 shows TEM images of nanoparticles depending on the feed concentrations of reference (×1.0) (A), 5-times dilution (×0.2) (B), and 10-times dilution (×0.1) (C) formed depending on the change in the feed concentration.

Referring to FIG. 14, the feed concentration trend in the CSTR of Comparative Example 1 showed a similar trend to that of the Example. That is, even in the CSTR, as the feed concentration decreased, the aggregation of nanoparticles decreased. However, in the Comparative Example, the nanoparticles were not completely dispersed even when the feed concentration was diluted by 10 times.

Further, viscous energy dissipation (ε) when the agitation speed of the CSTR of Comparative Example 1 is 3000 rpm is the same as when the rotation speed of the CT reactor of Example 1 is 500 rpm, as shown in Table 4 below. Accordingly, the fluid shear rates of the two reactors are similar.

The different dispersion of nanoparticles between the two reactors as shown in the above results is due to the different fluid flow pattern. That is, in the case of Example 1, a toroidal Taylor vortex flow is constantly and uniformly generated in the CT reactor by the rotation of the inner cylinder, which provides a constant fluid shear field to the entire region in the reactor. However, in the case of Comparative Example 1, a turbulence eddy flow occurs instantaneously by impeller stirring of the CSTR and disappears immediately, so that a constant fluid shear field could not be provided in the CSTR. In addition, the turbulent eddy flow was not uniform in the CSTR reactor and could not provide a uniform fluid shear field. As such, in the CSTR of Comparative Example 1, the fluid shear rate was high near the impeller, and decreased significantly away from the impeller. Therefore, the Taylor vortex flow (TVF) pattern according to the present disclosure was much more effective in dispersing nanoparticles than the turbulent eddy flow pattern of the Comparative Example even in the same amount of viscous energy dissipation. Accordingly, despite the same bulk average fluid shear rate in the two reactors, the dispersion of nanoparticles between the CT reactor of Example 1 and the CSTR of Comparative Example appears different.

Experimental Example 4: Comparison of Amount of Stabilizer Required for Nanoparticle Dispersion When a stabilizer is used in a process of preparing metal nanoparticles, the stabilizer may cause spatial hindrance between the nanoparticles to form dispersed nanoparticles. However, due to the use of the stabilizer, the active surface of the prepared nanoparticles is blocked, resulting in a problem that the functionality of the nanoparticles is degraded. Accordingly, it is very necessary to minimize the stabilizer in order to produce effective nanoparticles with a wide active surface.

Figure 16:
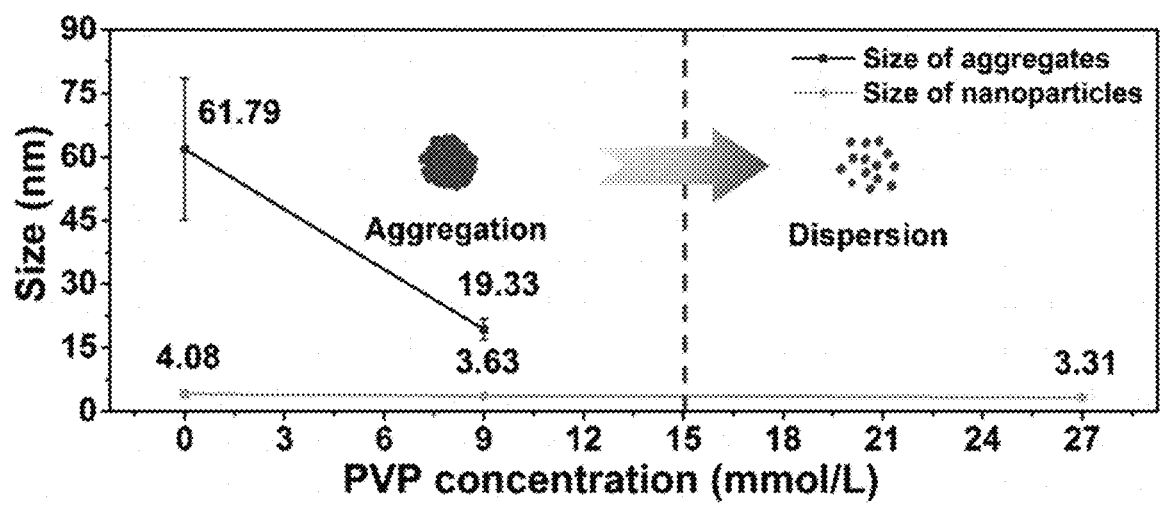
FIG. 16 shows comparison of dispersion and sizes of nanoparticles depending on a change in concentration of a stabilizer (PVP) supplied in Examples of the present disclosure.
Figure 17A:
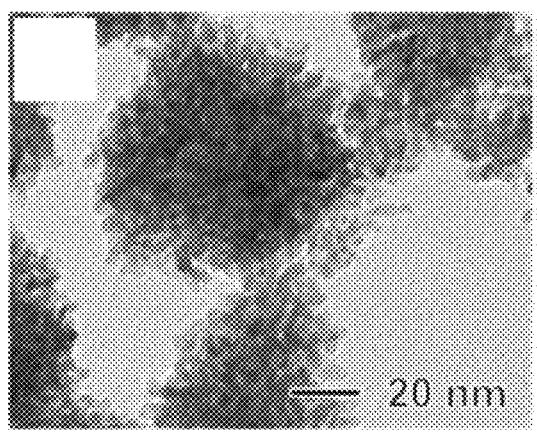
FIG. 17 shows TEM images of nanoparticles formed by changing the concentration of the stabilizer (PVP) supplied in Examples of the present disclosure.
Figure 17B:
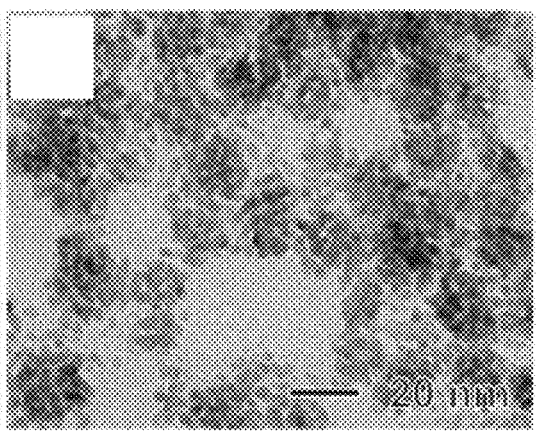
Figure 17C:
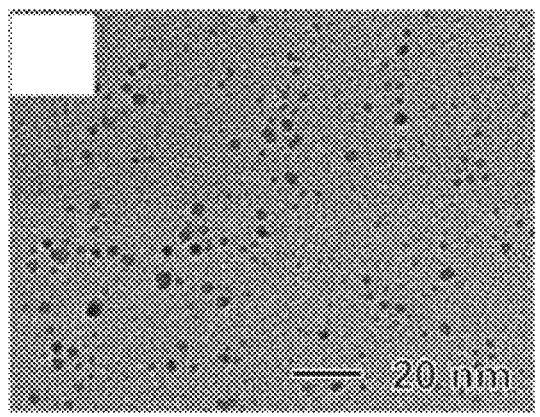

The dispersion of CuPd nanoparticles depending on the concentration of the stabilizer (PVP) supplied in Example 1 of the present disclosure is shown in FIGS. 16 and 17. As shown in Table 2 above, the standard concentration of PVP for well-dispersed CuPd alloy nanoparticles in the CT reactor of this Example is about 9 mM at the rotation speed of 1200 rpm.

Even according to Example 1 of the present disclosure, aggregation of CuPd alloy nanoparticles was inevitable in the CT reactor at 500 rpm using no stabilizer (PVP) as shown in FIG. 17A. However, when the PVP concentration increased to 9 mM at 500 rpm, the agglomerate size decreased significantly from 61.79 nm to 19.33 nm (b in

TABLE 4

| | Energy dissipation (ε) | | | | | | |
|---|---|---|---|---|---|---|---|
| | 0.0072 | 0.0258 | 0.0629 | 0.9495 | 3.3533 | 10.7067 | 29.1476 |
| Example (CT, rpm) | — | — | 100 | 300 | 500 | 800 | 1200 |
| Comparative Example (CSTR, rpm) | 300 | 500 | 700 | 1900 | 3000 | — | — |

However, the dispersion of nanoparticles in the two reactors was significantly different. That is, the nanoparticles were completely dispersed when the rotation speed of the CT reactor (Example) was 500 rpm (C and D in FIG. 13), while the nanoparticles were still severely agglomerated when the agitation speed of the CSTR (Comparative Example) was 3000 rpm (B and C in FIG. 15).

FIG. 17). In addition, when further increasing the PVP concentration to 27 mM (three times higher than the standard condition), aggregation was further significantly reduced, and complete dispersion of nanoparticles was easily achieved in the CT reactor at 500 rpm (c in FIG. 17).

Figure 18:
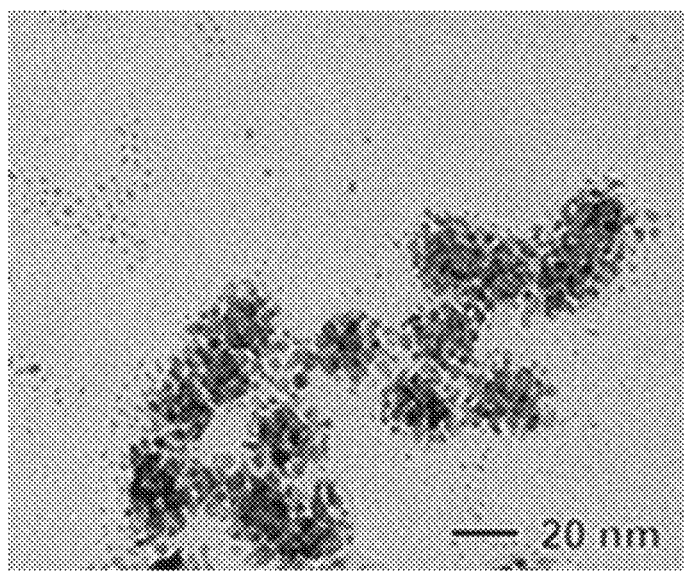
FIG. 18 shows a TEM image of nanoparticles formed when the stirring speed is 3000 rpm and the same amount of stabilizer as that in the FIG. 17C is used in the Comparative Example (CSTR).

However, nanoparticles prepared in the CSTR were seriously aggregated even at a high PVP concentration of 27 mM at 3000 rpm (FIG. 18). Accordingly, from these experimental results, it can be seen that the Taylor vortex flow (TVF) of Example 1 is very effective in nanoparticle dispersion compared to the conventional turbulence eddy flow.

Experimental Example 5: Comparison of CuPd Alloy Nanoparticle Properties Depending on Composition Ratio Control in Example 2

A PdCu/C catalyst having various Pd/Cu atomic ratios was prepared by changing the metal precursor concentration in the process of preparing CuPd alloy nanoparticles using the continuous CT reactor of Example 2. In FIGS. 20 and 21, the sizes of (a) $Pd_{36}Cu_{64}/C$, (b) $Pd_{41}Cu_{59}/C$, (c) $Pd_{55}Cu_{45}/C$, and (d) $Pd_{69}Cu_{31}/C$ prepared in the continuous CT reactor are shown, and the size of nanoparticles increases as the molar ratio of Pd increases.

Experimental Example 6: Comparison of CuPd Alloy Nanoparticle Properties Depending on Rotation Speed Control in Example 2

In the process of preparing the CuPd alloy nanoparticles using the continuous CT reactor of Example 2, various flow regions were generated by adjusting the rotation speed of the inner cylinder from 100 rpm to 1200 rpm. FIG. 23 shows the sizes of nanoparticles depending on the change in the rotation speed in Example 2.

The nanoparticles prepared at the low rotational speed of 100 rpm showed the formation of aggregates. Nevertheless, the nanoparticles prepared at a higher rotational speed were well dispersed on the carbon surface. The nanoparticle size decreased from 5.2 nm to 2.9 nm as the rotation speed increased from 100 rpm to 1200 rpm.

Experimental Example 7: Properties of PdCu Nanoparticles Prepared in MT Reactor in Comparative Example 2

Referring to FIG. 19 and FIG. 3, unlike the CT reactor (FIG. 19) of Example 2 in which the Taylor vortex flow TVF of a regular flow is formed, a turbulence eddy flow of the MT reactor of Comparative Example 2 is randomly generated (FIG. 3B)

As shown in the TEM images according to (A) and (B) in FIG. 24, PdCu nanoparticles prepared in the MT reactor (named $Pd_{43}Cu_{57}$/C-MT after ICP-MS analysis) were seriously aggregated on the surface of the carbon particles even at the high agitation speed of 3,000 rpm. These results were different from the nanoparticles prepared in the CT reactor.

Figure 25:
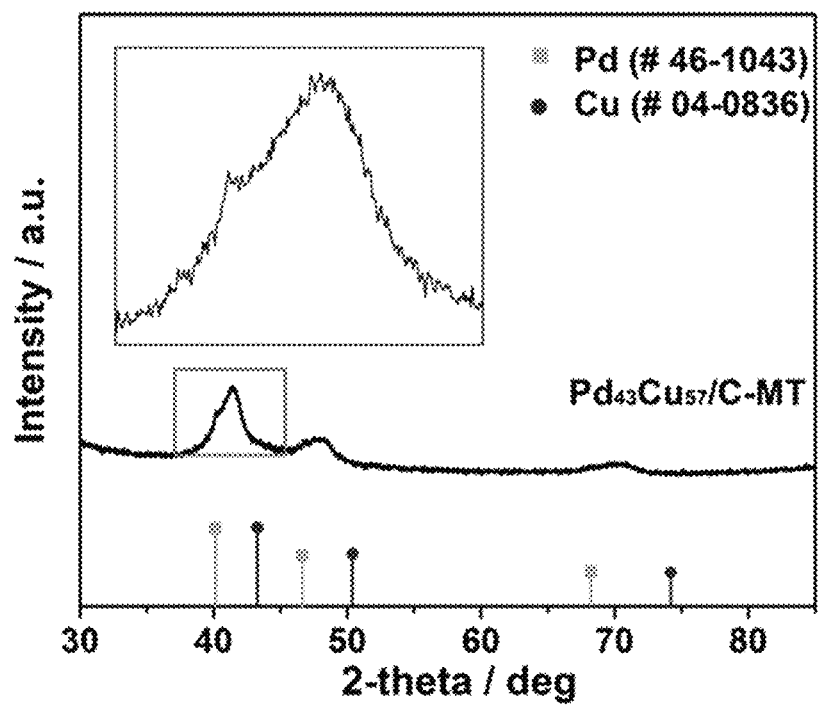
FIG. 25 shows an XRD spectrum of $Pd_{43}Cu_{57}/C$-MT, which is a comparative example.
Figure 26A:
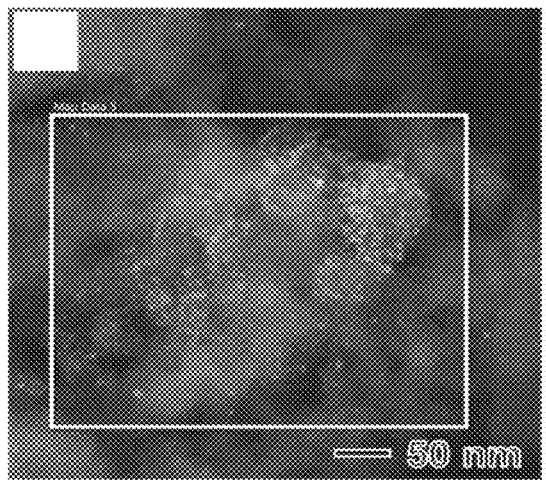
FIG. 26 shows a dark-field TEM image (26A) and EDS image of $Pd_{41}Cu_{59}/C$ (26B to 26E).
Figure 26B:
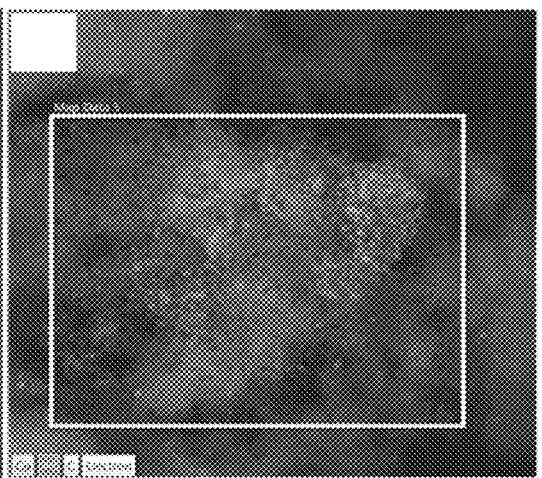
Figure 26C:
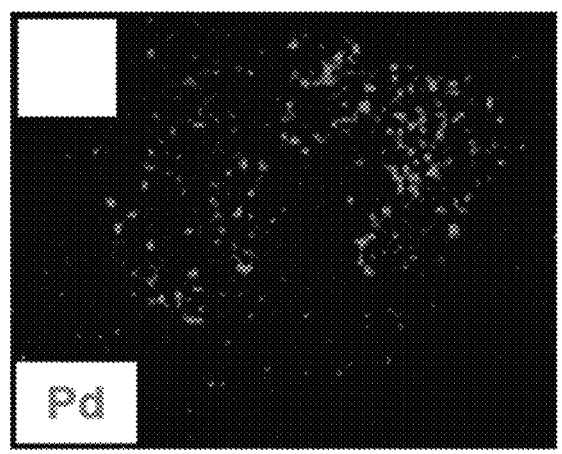
Figure 26D:
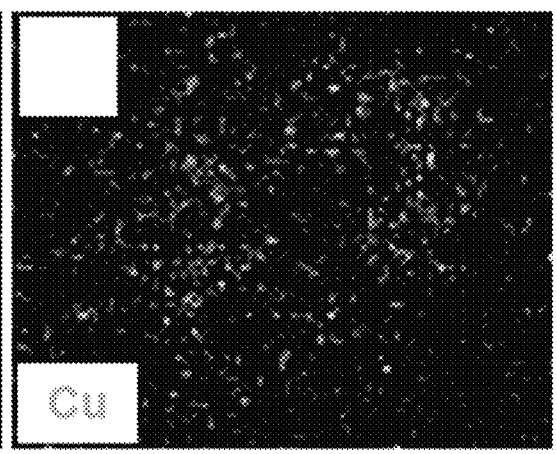
Figure 26E:
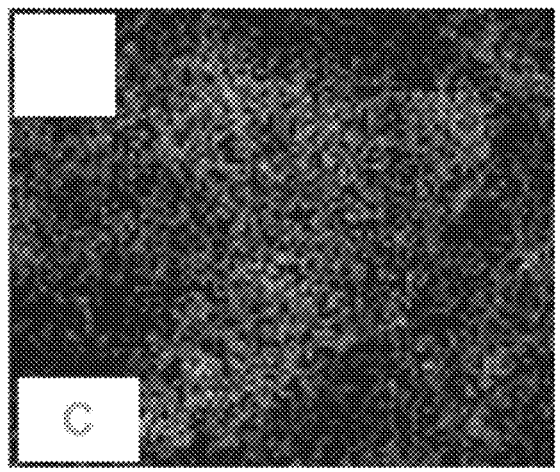
Figure 27:
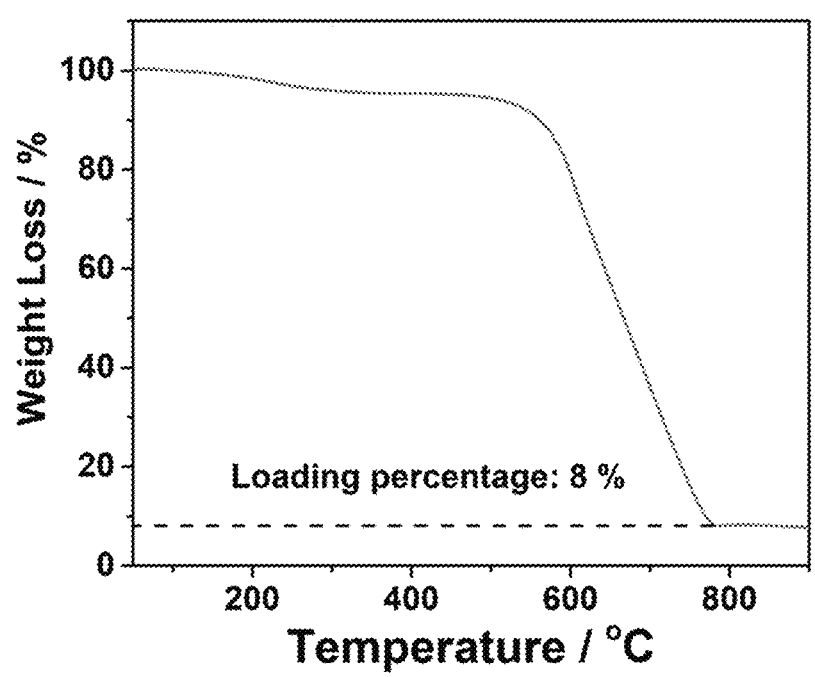
FIG. 27 shows a TGA graph of $Pd_{41}Cu_{59}/C$.

Referring to FIG. 25, it can be confirmed that the alloy is not well formed through the XRD spectrum of $Pd_{43}Cu_{57}$/C-MT.

Accordingly, even if the reaction is carried out with a support in the MT reactor, it can be confirmed that the result is different from that in the CT reactor, and through this, the characteristics of the periodic and uniform Taylor vortex flow (TVF) are important.

Experimental Example 8: Properties of PdCu Nanoparticle Prepared with PVP

PdCu/C particles containing PVP as a stabilizer were prepared in the CT reactor under the same synthesis conditions for PdCu/C (rotation speed of 1200 rpm) without a stabilizer. In this synthesis, it was observed that $Pd_{42}Cu_{58}$ nanoparticles were well dispersed on carbon particles and the average particle size of $Pd_{42}Cu_{58}$/C-PVP was 3.6 nm, slightly larger than $Pd_{41}Cu_{59}$/C-1200 (see c and d in FIG. 24).

The Taylor vortex flow plays an important role in stabilizer-free nanoparticles well dispersed in carbon due to uniform fluid shear and effective fine mixing derived from periodic flow patterns from the experimental results above. Strong toroidal circular motion of the Taylor vortex flow provided effective micro-mixing for enhanced response, thus inducing high nuclei at high supersaturation. Accordingly, as the rotation speed of the CT reactor increased, the nanoparticle size significantly decreased. In addition, the uniform fluid shear of the Taylor vortex flow effectively prevents the aggregation of nanoparticles in the solution, so that the nanoparticles are well dispersed in the carbon particles.

Further, when a stabilizer is included, the slow reduction rate due to the formation of PVP-metal precursor complex increases the size of the nanoparticles.

That is, the present disclosure presents a novel synthesis method for PdCu metal nanoparticles without carbon-supported stabilizers using the Taylor vortex flow (TVF) of the CT reactor. The CT reactor is advantageous in preparing PdCu metal nanoparticle due to strong mixing of the Taylor vortex flow. Furthermore, the stabilizer-free nanoparticles are effectively well dispersed by the uniform and periodic shear field of the Taylor vortex flow. In contrast, due to the random pattern of turbulent eddy flow (TEF), these nanoparticles were difficult to achieve in the conventional MT reactor even at the high agitation speed of 3,000 rpm.

Although the preferred embodiments of the present disclosure have been described in detail, the above embodiments are presented as specific examples of the present disclosure, and the scope of the present disclosure is not limited thereto, and various modifications and improvements by those skilled in the art using the basic concept of the present disclosure as defined in the claims to be described later are also included in the scope of the present disclosure.

What is claimed is:

1. A method comprising:
   preparing a dispersed metal nanoparticle by reacting a metal precursor in aqueous solution and under a Taylor vortex flow formed in a continuous Couette-Taylor reactor; and
   controlling at least one of a rotation speed of the continuous Couette-Taylor reactor above a critical speed, a mean residence time of the nanoparticles in the continuous Couette-Taylor reactor, and a feed concentration of the metal precursor to control dispersion of nanoparticles,
   and wherein the nanoparticles are copper-palladium alloy nanoparticles, the size of the nanoparticles is 0.5 to 10 nm, and the mean residence time is 2 minutes to 8 minutes.

2. The method of claim 1, comprising reacting the metal precursor in the aqueous solution and with a support under the Taylor vortex flow.

3. The method of claim 2, wherein the dispersed metal nanoparticle is prepared without a stabilizer as the Taylor vortex flow replaces the stabilizer in the preparing of metal nanoparticles and disperses the nanoparticles on the support.

4. The method of claim 1, wherein sizes of nanoparticles are controlled by controlling at least one of a rotation speed of the continuous Couette-Taylor reactor, a mean residence time of the nanoparticles in the continuous Couette-Taylor reactor, or a feed concentration of the metal precursor.

5. The method of claim 1, wherein a functionality, size, or degree of dispersion of the copper-palladium alloy nanoparticles is controlled by adjusting a molar ratio between the copper-palladium.

6. The method of claim 2, wherein the support is at least one selected from the group consisting of a carbon-based support, a metal oxide support, a polymer support, and a zeolite-based support.

* * * * *